United States Patent
Murata et al.

(10) Patent No.: US 9,627,672 B2
(45) Date of Patent: Apr. 18, 2017

(54) SEPARATOR FOR NONAQUEOUS ELECTROLYTE BATTERIES CONTAINING A POROUS MEMBRANE

(71) Applicant: ASAHI KASEI E-MATERIALS CORPORATION, Tokyo (JP)

(72) Inventors: Hiroshi Murata, Tokyo (JP); Hiroshi Hatayama, Tokyo (JP); Yuki Uchida, Tokyo (JP); Masaki Ishikawa, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 111 days.

(21) Appl. No.: 14/387,975

(22) PCT Filed: Mar. 28, 2013

(86) PCT No.: PCT/JP2013/059355
§ 371 (c)(1),
(2) Date: Sep. 25, 2014

(87) PCT Pub. No.: WO2013/147071
PCT Pub. Date: Oct. 3, 2013

(65) Prior Publication Data
US 2015/0050545 A1 Feb. 19, 2015

(30) Foreign Application Priority Data

Mar. 28, 2012 (JP) ................. 2012-074669
Mar. 28, 2012 (JP) ................. 2012-074689
(Continued)

(51) Int. Cl.
*H01M 2/18* (2006.01)
*H01M 2/16* (2006.01)
(Continued)

(52) U.S. Cl.
CPC .......... *H01M 2/1686* (2013.01); *B32B 27/08* (2013.01); *B32B 27/20* (2013.01); *B32B 27/32* (2013.01);
(Continued)

(58) Field of Classification Search
CPC .......... H01M 10/0525; H01M 2/1653; H01M 2/1686; H01M 2/166; H01M 2220/30;
(Continued)

(56) References Cited

U.S. PATENT DOCUMENTS

2010/0203396 A1 8/2010 Murata
2010/0285348 A1* 11/2010 Murata ................. B32B 27/20
429/144
(Continued)

FOREIGN PATENT DOCUMENTS

EP 1464669 A1 10/2004
JP H11-130900 A 5/1999
(Continued)

OTHER PUBLICATIONS

Partial Supplementary European Search Report issued in related European Patent Application No. 13769838.7 dated May 7, 2015.
(Continued)

*Primary Examiner* — Gary Harris
(74) *Attorney, Agent, or Firm* — Morgan, Lewis & Bockius LLP

(57) ABSTRACT

A multilayer porous membrane comprising a porous membrane containing a polyolefin resin as a main component; and a porous layer containing an inorganic filler and a resin binder and laminated on at least one surface of the porous membrane; wherein the porous membrane has an average pore size d=0.035 to 0.060 μm, a tortuosity $\tau_a$=1.1 to 1.7, and the number B of pores=100 to 500 pores/μm$^2$, which are
(Continued)

calculated by a gas-liquid method, and the porous membrane has a membrane thickness L=5 to 22 μm.

5 Claims, 5 Drawing Sheets

(30) Foreign Application Priority Data

Apr. 11, 2012 (JP) ................................. 2012-090420
Apr. 11, 2012 (JP) ................................. 2012-090470

(51) Int. Cl.
*B32B 27/32* (2006.01)
*H01M 10/0525* (2010.01)
*B32B 27/08* (2006.01)
*B32B 27/20* (2006.01)
*C08J 5/18* (2006.01)

(52) U.S. Cl.
CPC .............. *C08J 5/18* (2013.01); *H01M 2/166* (2013.01); *H01M 2/1653* (2013.01); *H01M 10/0525* (2013.01); *B32B 2255/10* (2013.01); *B32B 2255/26* (2013.01); *B32B 2264/102* (2013.01); *B32B 2307/306* (2013.01); *B32B 2307/518* (2013.01); *B32B 2307/724* (2013.01); *B32B 2457/10* (2013.01); *C08J 2323/06* (2013.01); *C08J 2323/16* (2013.01); *C08J 2423/10* (2013.01); *H01M 2220/20* (2013.01); *H01M 2220/30* (2013.01)

(58) Field of Classification Search
CPC ......... B32B 27/32; B32B 27/08; B32B 27/20; B32B 2255/10; B32B 2255/26; B32B 2264/102; B32B 2307/306; B32B 2307/518; B32B 2307/724; B32B 2457/10; C08J 5/18; C08J 2423/10
USPC ....................................................... 429/145
See application file for complete search history.

(56) References Cited

U.S. PATENT DOCUMENTS

| 2011/0223486 A1* | 9/2011 | Zhang ................ B01D 67/0027 429/247 |
| 2012/0015229 A1 | 1/2012 | Ohashi et al. |
| 2012/0034509 A1 | 2/2012 | Bae et al. |
| 2012/0141859 A1 | 6/2012 | Murata et al. |
| 2013/0216893 A1 | 8/2013 | Ueki et al. |

FOREIGN PATENT DOCUMENTS

| JP | 2008-210794 A | 9/2008 |
| JP | 2009-026733 A | 2/2009 |
| JP | 2009-129668 A | 6/2009 |
| JP | 2010-240936 A | 10/2010 |
| JP | 2011-000832 A | 1/2011 |
| JP | 2011-210574 A | 10/2011 |
| JP | 4789274 B | 10/2011 |
| JP | 2012-038655 A | 2/2012 |
| JP | 2012-048918 A | 3/2012 |
| JP | 2012048918 A * | 3/2012 |
| WO | 2008/093575 A1 | 8/2008 |
| WO | 2008/149986 A | 12/2008 |
| WO | 2010/027203 A2 | 3/2010 |
| WO | 2010/134585 A1 | 11/2010 |
| WO | 2012/002451 A1 | 1/2012 |
| WO | 2012/049748 A1 | 4/2012 |

OTHER PUBLICATIONS

International Search Report issued in corresponding International Patent Application No. PCT/JP2013/059355 dated Jul. 2, 2013.
Written Opinion issued in corresponding International Patent Application No. PCT/JP2013/059355 dated Jul. 2, 2013.
European Search Report issued in counterpart European Patent Application No. 13769838.7 dated May 23, 2016.

* cited by examiner

SEPARATOR FOR NONAQUEOUS ELECTROLYTE BATTERIES CONTAINING A POROUS MEMBRANE

TECHNICAL FIELD

The present invention relates to a membrane used for separation, decontamination, and the like of various substances, and a porous membrane and a multilayer porous membrane suitably used for a separator disposed between a positive electrode and a negative electrode in batteries. The present invention further relates to a separator for nonaqueous electrolyte batteries and a nonaqueous electrolyte battery.

BACKGROUND ART

Polyolefin porous membranes are widely used as a separator in batteries, capacitors, and the like because the polyolefin porous membranes show high electrical insulation properties and ionic permeability. Particularly, in recent years, lithium ion secondary batteries of high power density and high capacity density are used as the power supply for portable devices as the functions of the portable devices are increased and the weight thereof is reduced. The polyolefin porous membrane is mainly used as a separator used for such lithium ion secondary batteries.

The lithium ion secondary battery has high power density and high capacity density. Because of an organic solvent used for an electrolytic solution, however, the electrolytic solution is decomposed by generation of heat accompanied by abnormal situations such as a short circuit and overcharge. This may lead to ignition in the worst case. In order to prevent such situations, some safety functions are incorporated into the lithium ion secondary battery, and one of them is shutdown function of the separator. The shutdown function is a function that micro pores of the separator are blocked by thermofusion or the like to suppress conduction of ions in the electrolytic solution and to stop progression of an electrochemical reaction when the battery generates the abnormal heat. Usually, it is supposed that the lower the shutdown temperature is, the safer the battery is. The proper shutdown temperature of polyethylene is one of the reasons that polyethylene is used as a component for the separator. A problem of a battery having high energy, however, is that the temperature within the battery continues increasing even if progression of the electrochemical reaction is stopped by shutdown; as a result, the separator is thermally shrunk and broken, causing a short circuit (short out) between two electrodes.

On the other hand, nonaqueous electrolyte batteries such as lithium ion secondary batteries have been increasingly applied to electric vehicles, hybrid electric vehicles, and the like, which need charge and discharge of a large amount of current in a short time. Such applications require not only safety but also advanced output properties. Namely, high safety and advanced output properties need to be satisfied at the same time.

Patent Literature 1 discloses a multilayer porous membrane including a porous membrane composed of a polyolefin resin as a main component and a porous layer laminated on at least one surface of the porous membrane wherein the porous layer contains not less than 50% and less than 100% inorganic filler as a mass fraction. The literature describes the techniques for satisfying high heat resistance for preventing short-circuit of electrodes and excellent shutdown function at the same time even if the amount of heat generated is large in abnormal heat generation.

Patent Literature 2 discloses a polyolefin microporous membrane having a fibril diameter of 40 to 100 nm, a micropore size of 50 to 100 nm, and a tortuosity of 1.4 to 1.8. The literature describes the techniques for attaining high ion conductivity and mechanical strength even if a polyolefin microporous membrane and a heat-resistant porous layer are formed into a composite membrane.

LIST OF CITATIONS

Patent Literatures

Patent Literature 1: Japanese Patent No. 4789274
Patent Literature 2: Japanese Patent Laid-Open No. 2011-210574

SUMMARY OF INVENTION

Technical Problem

However, the ion conductivities of the conventional multilayer porous membranes as described in Patent Literature 1 and Patent Literature 2 are so insufficient that the requirement for high output properties in applications of vehicles or the like is not satisfied.

In consideration of such circumstances, an object of the present invention is to provide a porous membrane and a multilayer porous membrane having ion conductivity higher than those of the conventional multilayer porous membrane.

Solution to Problem

The present inventors conducted extensive research to solve the problems above, and found that a polyolefin porous membrane having a specific pore structure, or a multilayer porous membrane including a polyolefin porous membrane having a specific pore structure and a porous layer containing an inorganic filler and a resin binder and laminated on the polyolefin porous membrane has significantly high ion conductivity, and have achieved the present invention.

Namely, the present invention is as follows.

[1]

A multilayer porous membrane comprising: a porous membrane containing a polyolefin resin as a main component; and a porous layer containing an inorganic filler and a resin binder and laminated on at least one surface of the porous membrane;

wherein the porous membrane has an average pore size d=0.035 to 0.060 µm, a tortuosity $\tau_a$=1.1 to 1.7, and the number B of pores=100 to 500 pores/µm², which are calculated by a gas-liquid method, and the porous membrane has a membrane thickness L=5 to 22 µm.

[2]

The multilayer porous membrane according to the above [1], wherein the porous membrane has a porosity $\epsilon$=50 to 90%.

[3]

The multilayer porous membrane according to the above [1] or [2], wherein the porous membrane comprises a resin composition containing polypropylene and polyolefin other than the polypropylene.

[4]

The multilayer porous membrane according to the above [3], wherein a proportion of polypropylene based on total polyolefin in the resin composition is 1 to 35% by mass.

[5]
A separator for nonaqueous electrolyte batteries comprising the multilayer porous membrane according to any one of the above [1] to [4].

[6]
A nonaqueous electrolyte battery comprising the separator for nonaqueous electrolyte batteries according to the above [5], a positive electrode, a negative electrode, and an electrolytic solution.

[7]
A porous membrane containing a polyolefin resin as a main component,
wherein the porous membrane has a porosity $\epsilon$=50 to 90% and a shrinkage stress at 85° C. of not more than 2.2 gf.

[8]
A multilayer porous membrane comprising; the porous membrane according to the above [7]; and a porous layer containing an inorganic filler and a resin binder and laminated on at least one surface of the porous membrane.

[9]
The multilayer porous membrane according to the above [8], wherein the porous layer has a thickness of not less than 3 μm and not more than 50 μm.

[10]
A separator for nonaqueous electrolyte batteries, comprising the porous membrane according to the above [7] or the multilayer porous membrane according to the above [8] or [9].

[11]
A nonaqueous electrolyte battery, comprising the separator for nonaqueous electrolyte batteries according to the above [10], a positive electrode, a negative electrode, and an electrolytic solution.

[12]
A multilayer porous membrane comprising: a porous membrane (A) containing a polyolefin resin as a main component; and a porous layer (B) containing an inorganic filler and a resin binder and laminated on at least one surface of the porous membrane (A);
wherein the porous membrane (A) has a porosity of not less than 50% and not more than 90%, and the number of pores of not less than 100 pores/μm$^2$ and not more than 500 pores/μm$^2$, and
the resin binder contained in the porous layer (B) is a resin latex binder having an average particle size of not less than 50 nm and not more than 500 nm.

[13]
A separator for nonaqueous electrolyte batteries, comprising the multilayer porous membrane according to the above [12].

[14]
A nonaqueous electrolyte battery, comprising the separator for nonaqueous electrolyte batteries according to the above [13], a positive electrode, a negative electrode, and an electrolytic solution.

Advantageous Effects of Invention

The present invention can provide a porous membrane and a multilayer porous membrane having high ion conductivity, as well as a separator for nonaqueous electrolyte batteries and a nonaqueous electrolyte battery including the porous membrane or the multilayer porous membrane.

DESCRIPTION OF EMBODIMENTS

Figure 1:
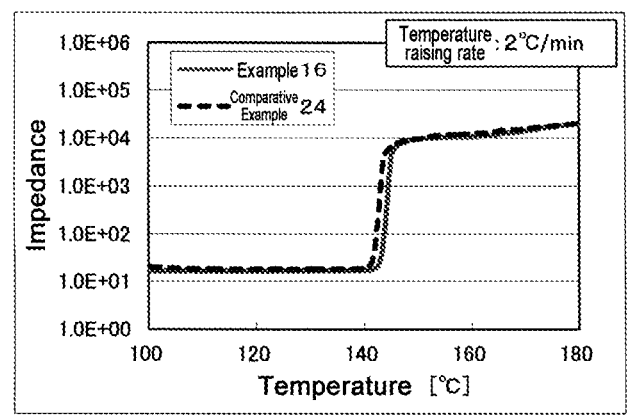
FIG. 1 shows the results of evaluation on shutdown at a temperature raising rate of 2° C./min in Example 16 and Comparative Example 24.

Now, the present embodiments (hereinafter abbreviated to "Embodiments") will be described in detail. The present invention will not be limited to the following embodiments, and various variations and modifications can be made within the gist of the scope, and implemented.

Embodiment 1

The multilayer porous membrane according to Embodiment 1 is a multilayer porous membrane comprising: a porous membrane containing a polyolefin resin as a main component; and a porous layer containing an inorganic filler and a resin binder and laminated on at least one surface of the porous membrane; wherein the porous membrane has an average pore size d=0.035 to 0.060 μm and a tortuosity $\tau_a$=1.1 to 1.7, and the number B of pores=100 to 500 pores/μm$^2$, which are determined by a gas-liquid method, and the porous membrane has a membrane thickness L=5 to 22 μm.

The porous membrane containing a polyolefin resin as a main component will be described.

From the viewpoint of improving shutdown performance and the like in the case where the multilayer porous membrane is used as a separator for batteries, the porous membrane containing a polyolefin resin as a main component is preferably a porous membrane composed of a polyolefin resin composition in which the polyolefin resin is not less than 50% and not more than 100% by mass of the resin components that constitute the porous membrane. The proportion of the polyolefin resin is more preferably not less than 60% and not more than 100% by mass, and still more preferably not less than 70% and not more than 100% by mass. Preferably, the polyolefin resin comprises not less than 50% by mass and not more than 100% by mass of all components that constitute the porous membrane.

Examples of the polyolefin resin include, but not limited to, homopolymers, copolymers or multistage polymers of ethylene, propylene, 1-butene, 4-methyl-1-pentene, 1-hexene, 1-octene, and the like. These polyolefin resins may be used singly or in combinations of two or more. Specific examples of the polyolefin resin include low density polyethylenes, linear low density polyethylenes, midium density polyethylenes, high density polyethylenes, ultra high molecular weight polyethylenes, isotactic polypropylenes, atactic polypropylenes, ethylene-propylene random copolymers, polybutenes, and ethylene propylene rubbers.

When the multilayer porous membrane is used as a separator for batteries, a resin composition containing high density polyethylene as a main component is preferably used as the polyolefin resin in particular from the viewpoint of satisfying the performance requirements of a low melting point and high strength.

More preferably, a resin composition containing polypropylene and a polyolefin resin other than the polypropylene is used from the viewpoint of an improvement in the heat resistance of the porous membrane and the multilayer porous membrane.

When polypropylene is contained in the polyolefin resin, the polypropylene has any steric structure, and may be any of isotactic polypropylene, syndiotactic polypropylene, and atactic polypropylene.

From the viewpoint of achieving a good balance between heat resistance and favorable shutdown function, the proportion of polypropylene based on the total polyolefin in the polyolefin resin composition is preferably 1 to 35% by mass, more preferably 3 to 20% by mass, and still more preferably 4 to 10% by mass. In this case, the polyolefin resin contained other than polypropylene is not limited, and examples thereof include homopolymers or copolymers of olefin hydrocarbons such as ethylene, 1-butene, 4-methyl-1-pentene, 1-hexene, and 1-octene. Specifically, examples thereof include polyethylenes, polybutenes, and ethylene-propylene random copolymers.

In the case where shutdown by blocking pores by thermofusion is required, for example, in the case where the multilayer porous membrane is used as a separator for batteries, use of polyethylenes such as low density polyethylenes, linear low density polyethylenes, medium density polyethylenes, high density polyethylenes, and ultrahigh molecular weight polyethylenes is preferred as the polyolefin resin other than the polypropylene. Among these, use of polyethylenes having a density of not less than 0.93 $g/cm^3$, which is measured according to JIS K 7112, is more preferred from the viewpoint of improving strength.

The viscosity average molecular weight of the polyolefin resin is preferably not less than 30,000 and not more than 12 million, more preferably not less than 50,000 and less than 2 million, and still more preferably not less than 100,000 and less than 1 million. The viscosity average molecular weight of not less than 30,000 is preferred because melt tension at the time of melt molding tends to be larger to provide high moldability, and entanglement of the polymers tends to provide higher strength. On the other hand, the viscosity average molecular weight of not more than 12 million is preferred because uniform melt kneading tends to be facilitated to provide higher moldability into the sheet, particularly higher stability in thickness of the sheet. Further, in the case where the multilayer porous membrane according to the present embodiment is used as a separator for batteries, the viscosity average molecular weight of less than 1 million is preferred because pores are easily blocked when the temperature is raised and favorable shutdown function tends to be obtained. Instead of using a polyolefin with a viscosity average molecular weight of less than 1 million alone, for example, a polyolefin mixture of a polyolefin having a viscosity average molecular weight of 2 million and a polyolefin having a viscosity average molecular weight of 270,000 wherein the viscosity average molecular weight of the polyolefin mixture is less than 1 million may be used.

The polyolefin resin composition can contain any additives. Examples of additives include polymers other than polyolefin; inorganic filler; antioxidants such as phenol antioxidants, phosphorus antioxidants, and sulfur antioxidants; metallic soaps such as calcium stearate and zinc stearate; an ultraviolet absorbing agent; a light stabilizer; an antistatic agent; an anti-fogging agent; and color pigments. The total amount of these additives to be added is preferably not more than 20 parts by mass, more preferably not more than 10 parts by mass, and still more preferably not more than 5 parts by mass based on 100 parts by mass of the polyolefin resin composition.

The porous membrane according to Embodiment 1 has a multipore structure in which a large number of very fine pores gather to form a fine communication pore. For such a structure, the porous membrane has very high ion conductivity, good voltage endurance, and high strength. The porous membrane according to Embodiment 1 is adjusted to have an average pore size d=0.035 to 0.060 μm, a tortuosity $\tau_a$=1.1 to 1.7, and the number B of pores=100 to 500 pores/μm², which are determined by the gas-liquid method described later in Examples. When the average pore size d, the tortuosity $\tau_a$, and the number B of pores are adjusted within the ranges above respectively, high ion conductivity and high voltage endurance can be attained at the same time.

The average pore size d is preferably 0.040 to 0.060 μm, more preferably 0.042 to 0.060 μm. The tortuosity $\tau_a$ is preferably 1.15 to 1.67, more preferably 1.18 to 1.66, still more preferably 1.20 to 1.65 μm. The number B of pores is preferably 120 to 450 pores/μm², more preferably 140 to 400 pores/μm².

The average pore size, the tortuosity, and the number of pores can be adjusted by controlling the composition ratio, the rate of cooling an extruded sheet, the stretching temperature, the stretch ratio, the heat setting temperature, the stretch ratio during heat setting, and the relaxation rate during heat setting, and combination thereof.

The membrane thickness L of the porous membrane according to Embodiment 1 is adjusted to L=5 to 22 μm. A membrane thickness of the porous membrane of not more than 22 μm reduces membrane resistance, which advantageously improves ion conductivity. The effect is remarkable when the porous layer is laminated to form a multilayer porous membrane. A membrane thickness of the porous membrane of not less than 5 μm improves voltage endurance. The membrane thickness of the porous membrane is preferably 6 to 21 μm, more preferably, 7 to 20 μm. The membrane thickness of the porous membrane can be adjusted by controlling the stretch ratio at a stretching step, or the like.

The porous membrane according to Embodiment 1 preferably has a porosity ϵ=50 to 90%. At a porosity of the porous membrane of not less than 50%, ion conductivity tends to improve, as membrane resistance tends to reduce. At a porosity of the porous membrane of not more than 90%, voltage endurance tends to improve. The porosity of the porous membrane is more preferably 50 to 80%, still more preferably 52 to 75%, particularly preferably 55 to 70%. The porosity of the porous membrane can be adjusted by controlling the mixing ratio of the polyolefin resin to a plasticizer, the stretching temperature, the stretch ratio, the heat setting temperature, the stretch ratio during heat setting, and the relaxation rate during heat setting, and combination thereof.

The puncture strength of the porous membrane according to Embodiment 1 is preferably 400 to 2000 gf in terms of a membrane thickness of 25 μm. The puncture strength of the porous membrane is more preferably 420 to 1800 gf, still more preferably 450 to 1500 gf, particularly preferably 500 to 1200 gf. The puncture strength of the porous membrane can be adjusted by controlling the kind of the polyolefin resin and the composition ratio thereof, the rate of cooling the extruded sheet, the stretching temperature, the stretch ratio, the heat setting temperature, the stretch ratio during heat setting, and the relaxation rate during heat setting, and combination thereof.

The process for producing the porous membrane according to Embodiment 1 is not particularly limited, but any known production process can be applied. Examples thereof include (1) a process for porosifying by melting and kneading a polyolefin resin composition and a plasticizer to mold the kneaded product into a sheet form, stretching the sheet when necessary, and extracting the plasticizer; (2) a process for porosifying by melting and kneading a polyolefin resin composition, extruding the kneaded product at a high draw ratio, and peeling off a polyolefin crystal interface by heat treatment and stretching; (3) a process for porosifying by melting and kneading a polyolefin resin composition and an inorganic filler, molding the kneaded product into a sheet form, and stretching the molded product to peel off the interface between the polyolefin and the inorganic filler; and (4) a process for porosifying by dissolving a polyolefin resin composition, and removing a solvent simultaneously with immersion in a poor solvent to the polyolefin to solidify the polyolefin.

Hereinafter, a process for melting and kneading a polyolefin resin composition and a plasticizer, molding the kneaded product into a sheet form, and extracting the plasticizer will be described as an example of the process for producing a porous membrane.

First, the polyolefin resin composition and the plasticizer are molten and kneaded. Examples of the melting kneading process include a process comprising: feeding a polyolefin resin and other additives when necessary to a resin kneading apparatus such as an extruder, a kneader, a Labo Plast mill, a mixing roll, or a Banbury mixer; and introducing and kneading a plasticizer at an arbitrary proportion while heat melting the resin component. Prior to feeding to the resin kneading apparatus, the polyolefin resin, the other additives, and the plasticizer are preferably kneaded in advance at a predetermined proportion using a Henschel mixer or the like. More preferably, the plasticizer is partially fed in the advance kneading, and the rest of the plasticizer is kneaded while being side fed in the resin kneading apparatus. Use of such a kneading method can enhance the dispersibility of the plasticizer. Thereby, a melt kneaded product of the resin composition and the plasticizer tends to be able to be stretched into a sheet-like molded product in a subsequent step at a high stretch ratio without being broken.

Any plasticizer can be used without particular limitation, and a non-volatile solvent that can form a uniform solution even at a temperature equal to or higher than a melting point of the polyolefin is preferably used. Specific examples of such a nonvolatile solvent include: hydrocarbons such as liquid paraffin and paraffin wax; esters such as dioctyl phthalate and dibutyl phthalate; and higher alcohols such as oleyl alcohol and stearyl alcohol.

Among these, preferred is liquid paraffin because it has high compatibility with polyethylene and polypropylene and causes no or little peeling at the interface between the resin and the plasticizer by stretching the molten and kneaded product, and thereby uniform stretching tends to be performed.

The proportion of the plasticizer to the polyolefin resin composition is not particularly limited, and the plasticizer can be added at any proportion in which the polyolefin resin composition and the plasticizer can be uniformly molten and kneaded to be molded into a sheet form. For example, the mass fraction of the plasticizer based on the composition composed of the polyolefin resin composition and the plasticizer is preferably 30 to 80% by mass, and more preferably 40 to 70% by mass. At a mass fraction of the plasticizer of not more than 80% by mass, insufficient melt tension at the time of melt molding tends not to be caused, leading to improved moldability. On the other hand, at a mass fraction of the plasticizer of not less than 30% by mass, polyolefin chains are not broken by stretching the mixture of the polyolefin resin composition and the plasticizer even at a high stretch ratio, easily leading to a uniform and micro pore structure. Moreover, strength tends to be increased.

Next, the molten and kneaded product is molded into a sheet form. Examples of a process for producing a sheet-like molded product include a process comprising extruding a molten and kneaded product into a sheet form through a T die or the like, contacting the extruded product with a heat conductive body to cool the extruded product to a temperature sufficiently lower than the crystallization temperature of the resin component and solidify the extruded product. Examples of a heat conductor used for cooling and solidification include metals, water, air, or the plasticizer itself. A metallic roll is preferably used because such a roll has high heat conductivity. More preferably, the extruded kneaded product is sandwiched between the metallic rolls when brought into contact with the metallic rolls because the heat conductivity is further increased, and the sheet tends to be oriented to have increased membrane strength and improved surface smoothness of the sheet. When the melt kneaded product is extruded into a sheet from a T die, the die lip clearance is preferably not less than 400 µm and not more than 3000 µm, more preferably not less than 500 µm and not more than 2500 µm. At a die lip clearance of not less than 400 µm, die drool and the like can be reduced to decrease adverse influences on the quality of the membrane such as streaks and defects, and reduce the risk of breakage of the membrane in the subsequent stretching step. On the other hand, at a die lip clearance of not more than 3000 µm, the cooling rate is higher to prevent unevenness in cooling and maintain the stability in thickness of the sheet.

Next, preferably, the thus-obtained sheet-like molded product is stretched. As the stretching treatment, either uniaxial stretching or biaxial stretching can be used suitably. From the viewpoint of improving strength of the porous membrane obtained, biaxial stretching is preferred. By stretching of the sheet-like molded product in two axial directions at a high stretch ratio, molecules are oriented in the planar direction, and thereby the porous membrane eventually obtained is difficult to tear and obtains high puncture strength. Examples of the stretching can include processes such as simultaneous biaxial stretching, successive biaxial stretching, multi stage stretching, and stretching several times. From the viewpoint of improvement in puncture strength, uniformity of stretching, and shutdown properties, the simultaneous biaxial stretching is preferred.

Here, the simultaneous biaxial stretching refers to a stretching process that simultaneously performs stretching in the MD (machine direction of the microporous membrane) and stretching in the TD (transverse direction intersecting the MD of the microporous membrane at an angle of 90°). The stretch ratios in the directions may be different. The successive biaxial stretching refers to a stretching process that performs stretching in the MD or that in the TD independently. When stretching is performed in one of the MD and the TD, the microporous membrane is non-restrained or fixed at a fixed length in the other direction thereof.

The stretch ratio is preferably in the range of not less than 20 times and not more than 100 times, and more preferably in the range of not less than 25 times and not more than 50 times in terms of an area ratio. The stretch ratio in each axial direction is preferably in the range of not less than 4 times and not more than 10 times in the MD and not less than 4 times and not more than 10 times in the TD, and more preferably in the range of not less than 5 times and not more than 8 times in the MD and not less than 5 times and not more than 8 times in the TD. At a total area ratio of not less than 20 times, sufficient strength tends to be given to the porous membrane obtained. On the other hand, at a total area ratio of not more than 100 times, breakage of the membrane at the stretching step tends to be prevented, and high productivity tends to be obtained.

The sheet-like molded product may be rolled. Rolling can be performed by a pressing that uses a double belt press machine, for example. Rolling can particularly increase orientation of a layer portion. The rolling area ratio is preferably more than 1 time and not more than 3 times, and more preferably more than 1 time and not more than 2 times. At a rolling ratio greater than 1 time, plane orientation tends to be increased to increase membrane strength of the porous membrane eventually obtained. On the other hand, when a rolling ratio is not more than 3 times, a porous structure having a small difference between the orientation of the layer portion and that of an inner central portion and uniformity in the thickness direction of the membrane tends to be formed.

Next, the plasticizer is removed from the sheet-like molded product to obtain a porous membrane. Examples of the process for removing a plasticizer include a process comprising immersing a sheet-like molded product in an extraction solvent to extract a plasticizer, and drying sufficiently. The process for extracting a plasticizer may be a batch process or a continuous process. In order to suppress shrinkage of the porous membrane, edges of the sheet-like molded product are preferably restrained during the series of steps of immersing and drying. The amount of the plasticizer remaining in the porous membrane is preferably less than 1% by mass based on the total mass of the porous membrane.

The solvent used for extraction of the plasticizer is preferably a poor solvent to the polyolefin resin and a good solvent to the plasticizer, and has a boiling point lower than the melting point of the polyolefin resin. Examples of such an extraction solvent include: hydrocarbons such as n-hexane and cyclohexane; halogenated hydrocarbons such as methylene chloride and 1,1,1-trichloroethane; non-chlorine halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be recovered by operation such as distillation to be reused.

In order to suppress shrinkage of the porous membrane, a heat treatment such as heat setting and thermal relaxation can also be performed after the stretching step or formation of the porous membrane. Alternatively, the porous membrane may be subjected to post-treatments such as hydrophilization treatment by a surface active agent, a crosslinking process by ionizing radiation, or the like.

The porous membrane is preferably treated with heat setting from the viewpoint of suppression of shrinkage. Examples of the heat setting method include relaxation operation performed in an atmosphere at a predetermined temperature and a predetermined relaxation rate, which can uses a tenter or a roll stretching machine. The relaxation operation refers to an operation of contraction of the membrane in MD and/or TD. The relaxation rate refers to a value obtained by dividing the size of the membrane in MD after the relaxation operation by the size of the membrane in MD before the operation, a value obtained by dividing the size of the membrane in TD after the relaxation operation by the size of the membrane in TD before the operation, or a value obtained by multiplying the relaxation rate in MD by the relaxation rate in TD when the relaxation operation is performed in both MD and TD. The relaxation rate is preferably not more than 1.0, more preferably not more than 0.97, still more preferably not more than 0.95.

The relaxation operation may be performed in both MD and TD, or may be performed in one of MD and TD. Before the relaxation operation, the membrane is stretched 1.8 times or more, more preferably 2.0 times or more in MD and/or TD to readily attain a porous membrane having high strength and high porosity. The stretching and relaxation operations after the extraction of the plasticizer are performed preferably in TD. The temperature in the relaxation operation and that in the stretching step before the relaxation operation are preferably lower than the melting point (Tm) of the polyolefin resin, more preferably in the range of Tm−5° C. to Tm−25° C., still more preferably in the range of Tm−7° C. to Tm−23° C., particularly preferably in the range of Tm−8° C. to Tm−21° C. The temperature in the relaxation operation and that in the stretching step before the relaxation operation within the ranges above readily attain a porous membrane having a small pore size, a low tortuosity, a larger number of pores, and high porosity.

Next, a porous layer containing an inorganic filler and a resin binder will be described.

Any inorganic filler can be used in the porous layer without particular limitation. A preferable inorganic filler has a melting point of not less than 200° C., high electrical insulation properties, and electrochemical stability in the conditions of lithium ion secondary batteries used.

Examples of the inorganic filler include: oxide ceramics such as alumina, silica, titania, zirconia, magnesia, ceria, yttria, zinc oxide, and iron oxide; nitride ceramics such as silicon nitride, titanium nitride, and boron nitride; ceramics such as silicon carbide, calcium carbonate, magnesium sulfate, aluminum sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth, and quartz sand; and glass fibers. These may be used singly or in combinations of two or more.

Among these, aluminum oxide compounds such as alumina and aluminum hydroxide oxide, and aluminum silicate compounds without ion exchangeability such as kaolinite, dickite, nacrite, halloysite, and pyrophyllite are preferable from the viewpoint of an improvement in electrochemical stability and the heat resistance properties of the multilayer porous membrane. For the aluminum oxide compounds, aluminum hydroxide oxide is particularly preferable. For the aluminum silicate compounds having no ion exchangeability, kaolin composed of mainly kaolin mineral is more preferable because kaolin is inexpensive and readily available. Kaolin includes wet kaolin and calcined kaolin prepared by calcining wet kaolin. Calcined kaolin is particularly preferable from the viewpoint of electrochemical stability because crystal water is discharged and impurities are removed during calcination.

The inorganic filler preferably has an average particle size of more than 0.1 μm and not more than 4.0 μm, more preferably more than 0.2 μm and not more than 3.5 μm, still more preferably more than 0.4 μm and not more than 3.0 μm. Adjustment of the average particle size of the inorganic filler within the range above is preferable from the viewpoint of suppression of thermal shrinkage at high temperatures even if the porous layer is thin (for example, not more than 7 μm).

In the inorganic fillers, the proportion of the particles having a particle size of more than 0.2 µm and not more than 1.4 µm based on the entire inorganic fillers is preferably not less than 2% by volume, more preferably not less than 3% by volume, still more preferably not less than 5% by volume, the upper limit is preferably not more than 90% by volume, and more preferably not more than 80% by volume.

In the inorganic fillers, the proportion of particles having a particle size of more than 0.2 µm and not more than 1.0 µm based on the entire inorganic fillers is preferably not less than 1% by volume, more preferably not less than 2% by volume, the upper limit is preferably not more than 80% by volume, and more preferably not more than 70% by volume.

In the inorganic fillers, the proportion of particles having a particle size of more than 0.5 µm and not more than 2.0 µm based on the entire inorganic fillers is preferably not less than 8% by volume, more preferably not less than 10% by volume, the upper limit is preferably not more than 60% by volume, and more preferably not more than 50% by volume.

Further, in the inorganic fillers, the proportion of particles having a particle size of more than 0.6 µm and not more than 1.4 µm based on the entire inorganic fillers is preferably not less than 1% by volume, more preferably not less than 3% by volume, the upper limit is preferably not more than 40% by volume, and more preferably not more than 30% by volume.

Adjustment of the particle size distribution of the inorganic filler within the range above is preferable from the viewpoint of suppression of thermal shrinkage at high temperatures even if the porous layer is thin (for example, not more than 7 µm). Examples of the method of adjusting the proportion of the particle size of the inorganic filler can include a method of crushing an inorganic filler with a ball mill, a bead mill, a jet mill, or the like to reduce the particle size.

Examples of the shape of the inorganic filler include plate shapes, flake shapes, needle shapes, column shapes, spherical shapes, polyhedric shapes, and bulk shapes. Inorganic fillers having the shapes above may be used in combination. The inorganic filler has any shape without particular limitation as long as the inorganic filler can suppress thermal shrinkage at 150° C. of the multilayer porous membrane described later to be not more than 10%. Polyhedric shapes, column shapes, and spindle shapes having several planes are preferable from the viewpoint of an improvement in permeability.

From the viewpoint of binding properties of the inorganic fillers and permeability and heat resistance of the multilayer porous membrane, the proportion of the inorganic fillers in the porous layer can be properly determined, and is preferably not less than 50% and less than 100% by mass, more preferably not less than 70% and not more than 99.99% by mass, still more preferably not less than 80% and not more than 99.9% by mass, and particularly more preferably not less than 90% and not more than 99% by mass.

While the kind of resin binder is not particularly limited, use of a resin binder insoluble to the electrolytic solution of the lithium ion secondary battery and electrochemically stable in the use conditions of the lithium ion secondary battery is preferred in the case where the multilayer porous membrane according to the present embodiment is used as a separator for lithium ion secondary batteries.

Specific examples of a resin binder include: polyolefins such as polyethylene and polypropylene; fluorine containing resins such as polyvinylidene fluoride and polytetrafluoroethylene; fluorine containing rubbers such as vinylidene fluoride-hexafluoropropylene-tetrafluoroethylene copolymers and ethylene-tetrafluoroethylene copolymers; rubbers such as styrene-butadiene copolymers and hydrides thereof, acrylonitrile-butadiene copolymers and hydrides thereof, acrylonitrile-butadiene-styrene copolymers and hydrides thereof, methacrylic acid ester-acrylic acid ester copolymers, styrene-acrylic acid ester copolymers, acrylonitrile-acrylic acid ester copolymers, ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having a melting point and/or a glass transition temperature of not less than 180° C. such as polyphenylene ether, polysulfone, polyethersulfone, polyphenylene sulfide, polyetherimide, polyamidoimide, polyamide, and polyester.

In the case where polyvinyl alcohol is used as a resin binder, the degree of saponification is preferably not less than 85% and not more than 100%. A degree of saponification of not less than 85% is preferred because an improved short-circuit temperature (short out temperature) and higher safe performance are tend to be obtained when the multilayer porous membrane is used as a separator for batteries. The degree of saponification is more preferably not less than 90% and not more than 100%, still more preferably not less than 95% and not more than 100%, and particularly more preferably not less than 99% and not more than 100%. The degree of polymerization of polyvinyl alcohol is preferably not less than 200 and not more than 5000, more preferably not less than 300 and not more than 4000, still more preferably not less than 500 and not more than 3500. Preferably, the degree of polymerization is not less than 200, because a small amount of polyvinyl alcohol can firmly bond the inorganic filler such as calcined kaolin to the porous membrane, and tends to be able to suppress an increase in air permeability of the multilayer porous membrane caused by formation of the porous layer while the mechanical strength of the porous layer is maintained. Also, the degree of polymerization of not more than 5000 is preferred because gelation and the like in preparation of a coating solution tend to be prevented.

For the resin binder, a resin latex binder is preferred. When the resin latex binder is used and a porous layer containing an inorganic filler and a binder is laminated on at least one surface of the polyolefin porous membrane, ionic permeability is not easily reduced and high output properties are easily obtained. Also when the temperature rises rapidly in abnormal heat generation, smooth shutdown properties are demonstrated to readily attain high safety. On the other hand, when part or all of the resin binder is dissolved in a solvent to prepare a solution, the solution is laminated on at least one surface of the polyolefin porous membrane, and the resin binder is bonded to the porous membrane by, e.g., removing the solvent by immersion of the membrane in a poor solvent or drying of the membrane, high output properties are difficult to obtain and smooth shutdown properties are difficult to demonstrate, which tends to lead to poor safety.

A preferable resin latex binder is those prepared by emulsion polymerization of: an aliphatic conjugated diene monomer; an unsaturated carboxylic acid monomer; and other monomers copolymerizable with the above monomers, from the viewpoint of an improvement in electrochemical stability and bonding properties. Any emulsion polymerization method can be used without particular limitation, and a conventionally known method can be used. Any method of adding a monomer and other components can be used without particular limitation, and any of a batch addition method, a divided addition method, and a continuous addition method can be used. Any of one-stage polymerization, two-stage polymerization, multistage polymerization, and the like can be used.

Examples of the aliphatic conjugated diene monomer include, but not limited to, 1,3-butadiene, 2-methyl-1,3-butadiene, 2,3-dimethyl-1,3-butadiene, 2-chloro-1,3-butadiene, substituted linear chain conjugated pentadienes, and substituted and side chain conjugated hexadienes. These may be used singly or in combinations of two or more. Among these, 1,3-butadiene is particularly preferable.

Examples of the unsaturated carboxylic acid monomer include, but not limited to, mono- or dicarboxylic acids (anhydrides) such as acrylic acid, methacrylic acid, crotonic acid, maleic acid, fumaric acid, and itaconic acid. These may be used singly or in combinations of two or more. Among these, acrylic acid and methacrylic acid are particularly preferable.

Examples of other monomers copolymerizable with the monomers above include, but not limited to, aromatic vinyl monomers, vinyl cyanide monomers, unsaturated carboxylic acid alkyl ester monomers, unsaturated monomers having hydroxy alkyl groups, and unsaturated carboxylic acid amide monomers. These may be used singly or in combinations of two or more. Among these, unsaturated carboxylic acid alkyl ester monomers are particularly preferable. Examples of the unsaturated carboxylic acid alkyl ester monomer include methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate. These may be used singly or in combinations of two or more. Among these, methyl methacrylate is particularly preferable.

In addition to these monomers, monomer components other than the monomers above can also be used to improve various quality and physical properties.

In Embodiment 1, the resin binder preferably has an average particle size of 50 to 500 nm, more preferably 60 to 460 nm, and still more preferably 80 to 250 nm. At an average particle size of the resin binder of not less than 50 nm, ionic permeability is not easily reduced and high output properties are easily obtained when the porous layer containing an inorganic filler and a binder is laminated on at least one surface of the polyolefin porous membrane. Also when the temperature rises rapidly in abnormal heat generation, smooth shutdown properties are demonstrated to readily attain high safety. At an average particle size of the resin binder of not more than 500 nm, high bonding properties are demonstrated, and the multilayer porous membrane tends to attain good thermal shrinkage and high safety.

The average particle size of the resin binder can be controlled by adjusting the polymerization time, the polymerization temperature, the composition ratio of raw materials, the order of feeding the raw materials, the pH, and the like.

The layer thickness of the porous layer is preferably not less than 1 μm from the viewpoint of an improvement in heat resistance and electrical insulation properties, and preferably not more than 50 μm from the viewpoint of higher capacity of the battery and an improvement in permeability. The layer thickness of the porous layer is more preferably not less than 1.5 μm and not more than 20 μm, more preferably not less than 2 μm and not more than 10 μm, still more preferably not less than 3 μm and not more than 10 μm, particularly preferably not less than 3 μm and not more than 7 μm.

The layer density of the porous layer is preferably 0.5 to 2.0 $g/cm^3$, and more preferably 0.7 to 1.5 $cm^3$. At a layer density of the porous layer of not less than 0.5 $g/cm^3$, the thermal shrinkage rate at high temperatures tends to be improved. At a layer density of not more than 2.0 $g/cm^3$, air permeability tends to be reduced.

Examples of a process for forming a porous layer can include a process of applying a coating solution containing inorganic fillers and a resin binder on at least one surface of a porous membrane containing a polyolefin resin as a main component to form a porous layer.

As a solvent for the coating solution, those that can disperse the inorganic fillers and the resin binder uniformly and stably are preferred. Examples thereof include N-methylpyrrolidone, N,N-dimethylformamide, N,N-dimethylacetamide, water, ethanol, toluene, hot xylene, methylene chloride, and hexane.

In order to stabilize distribution and to improve applicability, various additives such as a dispersing agent such as a surface active agent; a thickener; a wetting agent; an antifoaming agent; a pH adjusting agent containing an acid or an alkali may be added to the coating solution. Among these additives, the additives that can be removed at the time of removing the solvent are preferred. The porous layer, however, may have any remaining additive that is electrochemically stable in the use conditions of the lithium ion secondary battery, does not obstruct a cell reaction, and is stable to approximately 200° C.

A method for dispersing the inorganic fillers and the resin binder in a solvent for a coating solution is not particularly limited as long as the method can realize dispersion properties of the coating solution necessary for an application step. Examples thereof include mechanical stirring by a ball mill, a bead mill, a planet ball mill, a vibration ball mill, a sand mill, a colloid mill, an attritor, a roll mill, high-speed impeller distribution, a disperser, a homogenizer, a high-speed impact mill, ultrasonic dispersion, and an impeller.

A method for applying a coating solution to a porous membrane is not particularly limited as long as it can provide a necessary layer thickness and area to be applied. Examples thereof include a gravure coater method, a small diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, screen printing, and spray coating.

Further, performing a surface treatment on the surface of the porous membrane prior to applying a coating solution is preferred because the coating solution is easily applied and adhesiveness between the inorganic filler containing porous layer and the surface of the porous membrane after application is improved. A process for the surface treatment is not particularly limited as long as it does not impair the porous structure of the porous membrane remarkably. Examples thereof include corona discharge treatment, mechanical surface roughening, a solvent treatment, an acid treatment, and ultraviolet rays oxidation.

A process for removing a solvent from a coated membrane after application is not particularly limited as long as it does not have an adverse influence on the porous membrane. Examples thereof include a process for drying a porous membrane at a temperature not more than the melting point thereof and a process for performing reduced pressure drying at a low temperature, while fixing a porous membrane. Preferably, the drying temperature, a tension in winding, and the like are properly adjusted from the viewpoint of controlling shrinkage stress applied in MD of the porous membrane and in MD of the multilayer porous membrane.

Embodiment 2

The porous membrane according to Embodiment 2 is a porous membrane containing a polyolefin resin as a main component, wherein the porous membrane has a porosity $\epsilon=50$ to 90%, and the porous membrane has a shrinkage stress at 85° C. of not more than 2.2 gf.

The same polyolefin resin and additives as those described in Embodiment 1 can be contained in the porous membrane according to Embodiment 2.

The shrinkage stress at 85° C. of the porous membrane according to Embodiment 2 is adjusted to not more than 2.2 gf.

Entry of moisture into the nonaqueous electrolyte battery can cause a reduction of the cycle life and the capacity of the battery. Thus, a drying step is often performed before the electrolytic solution is poured into the battery. The drying step often involves heating. Formation of the porous layer containing an inorganic filler and a resin binder provides a great effect of suppressing thermal shrinkage to decrease shrinkage of the separator. However, probably in the process in which the porous membrane is once heated in the drying step and returned to normal temperature, the polyolefin resin flows in a complex manner to change the pore structure. Probably, this phenomenon becomes remarkable particularly when the porosity is high. On the basis of the knowledge, the present inventors found that a polyolefin porous membrane having a shrinkage stress at a predetermined temperature adjusted in not more than a specific range can attain high output properties and uniformity at the same time. The present inventors also found that the porous layer containing an inorganic filler and a resin binder is laminated on the porous membrane to attain higher output properties and uniformity at the same time.

The shrinkage stress at 85° C. of the porous membrane is preferably not more than 2 gf, and more preferably not more than 1.8 gf. The shrinkage stress can be determined by the method (TMA) described later in Examples. The shrinkage stress refers to the shrinkage stress in both MD (machine direction) and TD (transverse direction crossing the machine direction at 90°), and the shrinkage stress in MD and that in TD are adjusted to not more than 2.2 gf. At a shrinkage stress at 85° C. of not more than 2.2 gf, the polyolefin pore structure barely changes during drying the battery, leading to advantages in that ion conductivity and the uniformity of ion conductivity are difficult to impair.

An effective method of adjusting the shrinkage stress of the porous membrane to not more than 2.2 gf is thermal relaxation. For example, to prepare a porous membrane having a porosity of not less than 50% and a shrinkage stress at 85° C. of not more than 2.2 gf, preferably, a porous membrane having a high porosity of not less than 51% is prepared, and is then subjected to thermal relaxation at a relaxation rate of less than 1.0. The control of shrinkage stress by thermal relaxation can be conducted by adjusting the relaxation rate, the heat treatment temperature, strength, the polyolefin resin composition, and the like.

The porosity $\epsilon$ of the porous membrane according to Embodiment 2 is adjusted to 50 to 90%. At a porosity of the porous membrane of not less than 50%, membrane resistance tends to be reduced, and thus therewith ion conductivity tends to be improved. At a porosity of the porous membrane of not more than 90%, puncture strength tends to be improved. The porous membrane preferably has a porosity of 50 to 80%, more preferably 52 to 75%, and still more preferably 55 to 70%. The porosity of the porous membrane can be adjusted by controlling the mixing ratio of the polyolefin resin to the plasticizer, the stretching temperature, the stretch ratio, the heat setting temperature, the stretch ratio during heat setting, and the relaxation rate during heat setting, and combination thereof.

The description of the physical properties and the production method of the porous membrane according to Embodiment 2 other than above are the same as those in Embodiment 1. The description of the porous layer containing an inorganic filler and a resin binder is the same as that in Embodiment 1.

Embodiment 3

The multilayer porous membrane according to Embodiment 3 is a multilayer porous membrane including a porous membrane (A) containing a polyolefin resin as a main component, and a porous layer (B) containing an inorganic filler and a resin binder and laminated on at least one surface of the porous membrane, wherein a porosity of the porous membrane (A) is not less than 50% and not more than 90%, and the number of pores is not less than 100 pores/$\mu m^2$ and not more than 500 pores/$\mu m^2$, and the resin binder in the porous layer (B) is a resin latex binder having an average particle size of not less than 50 nm and not more than 500 nm.

The same polyolefin resin and additives as those in Embodiment 1 can be contained in the porous membrane according to Embodiment 3.

In Embodiment 3, the porosity of the porous membrane (A) containing a polyolefin resin as a main component is adjusted to not less than 50% and not more than 90%. A porosity of not less than 50% attains high ionic permeability, leading to high output properties when the multilayer porous membrane is used as a separator for nonaqueous electrolyte batteries. A porosity of not more than 90% reduces the risk of self-discharge and improves reliability when the multilayer porous membrane is used as a separator for nonaqueous electrolyte batteries. The porosity of the porous membrane (A) is preferably not less than 50% and not more than 80%, more preferably not less than 52% and not more than 75%, and still more preferably not less than 55% and not more than 70%.

The porosity can be adjusted by controlling the mixing ratio of the polyolefin resin to the plasticizer, the draw ratio of the extruded sheet, the stretching temperature, the stretch ratio, the heat setting temperature, the stretch ratio during heat setting, and the relaxation rate during heat setting, and combining these.

The number of pores per unit area of the porous membrane (A) is adjusted to not less than 100 pores/$\mu m^2$ and not more than 500 pores/$\mu m^2$. If the number of pores is not less than 100 pores/$\mu m^2$ and not more than 500 pores/$\mu m^2$, high output properties are attained because a reduction in permeability caused by penetration, clogging or the like of the inorganic filler and the binder is small when a porous layer (B) containing an inorganic filler and a binder is formed on the surface of the porous membrane (A). Also, high safety is attained, because excellent shutdown properties are demonstrated when the temperature raising rate is significantly high due to abnormal heat generation. The lower limit of the number of pores in the porous membrane (A) is preferably not less than 120 pores/μm², and more preferably not less than 130 pores/μm², and the upper limit is preferably not more than 460 pores/μm², and more preferably not more than 400 pores/μm².

The number of pores can be adjusted by controlling the mixing ratio of the polyolefin resin to the plasticizer, the rate of cooling the extruded sheet, the degree of rolling the extruded sheet, the stretching temperature, the stretch ratio, the heat setting temperature, the stretch ratio during heat setting, and the relaxation rate during heat setting, and combining these. In particular, the number of pores is significantly influenced by the stretching temperature, the stretch ratio, and the heat setting temperature.

The membrane thickness of the porous membrane (A) is preferably in the range of not less than 2 μm and not more than 40 μm, and more preferably not less than 5 μm and not more than 35 μm. A membrane thickness of not less than 2 μm tends to attain sufficient mechanical strength. A membrane thickness of not more than 40 μm advantageously tends to attain higher capacity of the battery because the volume occupied by the separator is reduced.

The air permeability of the porous membrane (A) is preferably not less than 10 seconds and not more than 500 seconds, and more preferably not less than 20 seconds and not more than 400 seconds. An air permeability of not less than 10 seconds tends to reduce self-discharge when the multilayer porous membrane is used as a separator for battery. An air permeability of not more than 500 seconds tends to attain good charge and discharge properties.

The pore size of the porous membrane (A) is preferably 0.01 to 3 μm, more preferably 0.02 to 1 μm, and still more preferably 0.035 to 0.060 μm. A pore size of not less than 0.01 μm tends to attain high output properties because a reduction in permeability caused by penetration, clogging or the like of the inorganic filler and the binder is small when a porous layer (B) containing an inorganic filler and a binder is formed on the surface of the porous membrane (A). A pore size of not more than 5 μm tends to reduce self-discharge when the multilayer porous membrane is used as a separator for batteries.

The pore size can be adjusted by controlling the mixing ratio of the polyolefin resin to the plasticizer, the rate of cooling the extruded sheet, the stretching temperature, the stretch ratio, the heat setting temperature, the stretch ratio during heat setting, and the relaxation rate during heat setting, and combining these. In particular, the pore size is significantly influenced by the mixing ratio of the polyolefin resin to the plasticizer, the stretching temperature, the stretch ratio, and the heat setting temperature.

Next, the porous layer (B) containing an inorganic filler and a resin binder will be described.

The same inorganic filler and resin binder as those described in Embodiment 1 can be contained in the porous layer (B) according to Embodiment 3.

In Embodiment 3, a resin latex binder is used as a resin binder. As described herein, the term "resin latex" refers to a resin dispersed in a medium. The resin latex binder barely reduces ionic permeability and readily attains high output properties when the porous layer (B) containing an inorganic filler and a resin binder is laminated on at least one surface of the polyolefin porous membrane. Also when the temperature rises rapidly in abnormal heat generation, smooth shutdown properties are demonstrated to readily attain high safety.

In Embodiment 3, the average particle size of the resin latex binder is adjusted to 50 to 500 nm. The average particle size of the resin latex binder is preferably 60 to 460 nm, and more preferably 80 to 220 nm. An average particle size of not less than 50 nm barely reduces ionic permeability and readily attains high output properties when the porous layer (B) containing an inorganic filler and a resin binder is laminated on at least one surface of the polyolefin porous membrane. Also when the temperature rises rapidly in abnormal heat generation, smooth shutdown properties are demonstrated to readily attain high safety. An average particle size of not more than 500 nm attains high bonding properties, which tends to lead to good thermal shrinkage and high safety when the porous layer is used in the multilayer porous membrane.

The average particle size of the resin latex binder can be controlled by adjusting the polymerization time, the polymerization temperature, the composition ratio of raw materials, the order of feeding raw materials, the pH, and the like.

The layer thickness of the porous layer (B) is preferably not less than 1 μm from the viewpoint of an improvement in heat resistance and electrical insulation properties, and preferably not more than 50 μm from the viewpoint of obtaining higher capacity of the battery and an improvement in permeability. The layer thickness of the porous layer is more preferably not less than 1.5 μm and not more than 20 μm, more preferably not less than 2 μm and not more than 10 μm, still more preferably not less than 3 μm and not more than 10 μm, and particularly preferably not less than 3 μm and not more than 7 μm.

The description of the method for forming the porous layer (B) is similar to that in Embodiment 1.

Next, cases where the porous membranes or the multilayer porous membranes according to Embodiments 1 to 3 are used as a separator for batteries will be described.

The porous membranes or the multilayer porous membranes according to Embodiments have high heat resistance and shutdown function, and are suitable for a separator for batteries that separates a positive electrode from a negative electrode in the battery.

In particular, the porous membranes or the multilayer porous membranes according to Embodiments barely make a short circuit at high temperatures, and can be safely used as a separator for batteries with a high electromotive force.

Examples of the batteries with a high electromotive force include nonaqueous electrolyte batteries. The nonaqueous electrolyte battery can be produced by a standard method, for example, by disposing the porous membrane or the multilayer porous membrane according to Embodiments between a positive electrode and a negative electrode and allowing a nonaqueous electrolytic solution to be held.

Any known positive electrode, negative electrode, and nonaqueous electrolytic solution can be used without particular limitation.

Examples of positive electrode materials include lithium-containing complex oxides such as $LiCoO_2$, $LiNiO_2$, spinel type $LiMnO_4$, $Li[Ni_xMn_yCo_z]O_2$ (where x, y, and z satisfy x+y+z=1 and $0 \leq x < 1$, $0 \leq y < 1$, and $0 \leq z < 1$), and olivine type $LiFePO_4$. Examples of negative electrode materials include: carbon materials such as graphite, non-graphitizable carbon, graphitizable carbon, and composite carbon; silicon; tin; metal lithium; and a variety of alloy materials.

As the nonaqueous electrolytic solution, an electrolytic solution prepared by dissolving an electrolyte in an organic solvent can be used. Examples of the organic solvent include propylene carbonate, ethylene carbonate, dimethyl carbonate, diethyl carbonate, and ethyl methyl carbonate. Examples of the electrolyte include lithium salts such as $LiClO_4$, $LiBF_4$, and $LiPF_6$.

In the case where the porous membrane or the multilayer porous membrane is used as a separator for batteries, the air permeability of the porous membrane or the multilayer porous membrane is preferably not less than 10 seconds/100 cc and not more than 500 seconds/100 cc, more preferably not less than 20 seconds/100 cc and not more than 400 seconds/100 cc, and still more preferably not less than 30 seconds/100 cc and not more than 300 seconds/100 cc. At an air permeability of not less than 10 seconds/100 cc, the self-discharge tends to be reduced, when used as a separator for batteries. At an air permeability of not more than 500 seconds/100 cc, good charging and discharging properties tend to be obtained.

The membrane thickness of the porous membrane or the multilayer porous membrane is preferably not less than 2 μm and not more than 200 μm, more preferably not less than 5 μm and not more than 100 μm, and still more preferably not less than 7 μm and not more than 30 μm. At a membrane thickness of not less than 2 μm, sufficient mechanical strength tends to be obtained. At a membrane thickness of not more than 200 μm, the volume occupied by the separator tends to be reduced, which is advantageous from the viewpoint of increase in the battery capacity.

The thermal shrinkage rate at 150° C. of the porous membrane or the multilayer porous membrane is preferably not less than 0% and not more than 15%, more preferably not less than 0% and not more than 10%, and still more preferably not less than 0% and not more than 5%, both in the MD and in the TD. A thermal shrinkage rate of not more than 15% in the MD and the TD is preferred because breakage of the multilayer porous membrane at the time of abnormal heat generation of the battery tends to be suppressed, and hardly causing a short circuit.

The shutdown temperature of the porous membrane or the multilayer porous membrane is preferably not less than 120° C. and not more than 160° C., and more preferably not less than 120° C. and not more than 150° C. A shutdown temperature of not more than 160° C. is preferred because rapid current interruption tends to promote when the battery generates heat, providing higher safe performance. On the other hand, a shutdown temperature of not less than 120° C. is preferred because the battery can be used at around 100° C.

The shutdown temperature can be adjusted by controlling the kind of the polyolefin resin and the composition ratio thereof, the stretching temperature, the stretch ratio, the heat setting temperature, the stretch ratio during heat setting, and the relaxation rate during heat setting, and combining these.

The short-circuit temperature of the porous membrane or the multilayer porous membrane is preferably not less than 180° C. and not more than 1000° C., and more preferably not less than 200° C. and not more than 1000° C. At a short-circuit temperature of not less than 180° C., even if abnormal heat generation occurs in the battery, a short circuit does not immediately occur. Accordingly, the heat can be dissipated during that period, and higher safe performance is obtained.

The short-circuit temperature can be controlled at a desired value by adjusting the content of polypropylene, the kind of polyolefin other than polypropylene, the kind of inorganic fillers, the thickness of the inorganic filler containing porous layer, and the like.

The various parameters mentioned above are measured according to measuring methods in Examples described later, unless otherwise specified.

EXAMPLES

Hereinafter, Embodiments will be described in more detail. Here, Embodiments are not limited to the following Examples as long as it does not go beyond the gist thereof.

Examples 1 to 11 below correspond to the examples for Embodiment 1.

In Examples, physical properties were determined by the following methods. If the atmosphere for the measurement is not specified, the measurement was performed in the air at 23° C. and a pressure of 1 atm.

(1) Viscosity Average Molecular Weight (Mv) of Polyolefin

The limiting viscosity [η] (dl/g) at 135° C. in a decalin solvent was determined according to ASTM-D4020.

The Mv of Polyethylene was calculated by the following equation.

$$[\eta] = 6.77 \times 10^{-4} Mv^{0.67}$$

The Mv of polypropylene was calculated by the following equation.

$$[\eta] = 1.10 \times 10^{-4} Mv^{0.80}$$

(2) Membrane Thickness of Porous Membrane or Multilayer Porous Membrane, and Layer Thickness of Porous Layer Samples of MD 10 mm×TD 10 mm were cut out from a porous membrane and a multilayer porous membrane. In each sample, nine points (three points×three points) positioned in a lattice shape were selected, and the membrane thicknesses thereof were measured using a dial gauge (made by Ozaki MFG. Co., Ltd., PEACOCK No. 25 (registered trademark)). The membrane thickness (μm) of the porous membrane and that of the multilayer porous membrane each were defined as the average value of the measured values at the nine points. The difference between the membrane thickness of the multilayer porous membrane thus measured and that of the porous membrane thus measured was defined as the layer thickness (μm) of the porous layer.

(3) Porosity (%) of Porous Membrane

A sample of a 10 cm×10 cm square was cut out from the porous membrane, and the volume (cm$^3$) and mass (g) thereof were determined. Applying a membrane density of 0.95 (g/cm$^3$) for the porous membrane, the porosity was calculated using the following equation.

$$\text{Porosity (\%)} = (1 - \text{mass/volume}/0.95) \times 100$$

(4) Air Permeability of Porous Membrane and Multilayer Porous Membrane

Using a Gurley type densometer (made by Toyo Seiki Seisaku-sho, Ltd., G-B2 (trademark), the mass of the internal cylinder: 567 g) according to JIS P-8117, a time (sec) taken for 100 cc of the air to pass through the porous membrane having an area of 645 mm$^2$ (a circle having a diameter of 28.6 mm) and a time (sec) taken for 100 cc of the air to pass through the multilayer porous membrane having the same size were measured. These measured values were defined as the air permeability (sec/100 cc) of the porous membrane and that of the multilayer porous membrane, respectively.

(5) Average Particle Size of Inorganic Fillers

Inorganic fillers were added to distilled water, a small amount of an aqueous solution of sodium hexametaphosphate was added thereto, and dispersed for 1 minute by an ultrasonic homogenizer. Then, particle size distribution was measured using a laser particle size distribution analyzer (made by Nikkiso Co., Ltd., Microtrac MT3300EX). The average particle size (μm) was defined as a particle size when a cumulative frequency reached 50%.

(6) Average Pore Size, Tortuosity, and the Number of Pores of Porous Membrane Determined by Gas-Liquid Method It is known that a fluid in a capillary flows according to the Knudsen flow when the mean free path of the fluid is larger than the pore size of the capillary, and flows according to the Poiseuille flow when the mean free path of the fluid is smaller than the pore size of the capillary. Thus, it is assumed that the air stream in the measurement of the air permeability of the porous membrane follows the Knudsen flow, and the water stream in the measurement of water permeability of the porous membrane follows the Poiseuille flow.

In this case, the average pore size d (µm) and the tortuosity $\tau_a$ (dimensionless) of the porous membrane were determined from the air penetration rate constant $R_{gas}$ (m$^3$/(m$^2$·sec·Pa)), the water penetration rate constant $R_{liq}$ (m$^3$/(m$^2$·sec·Pa)), the velocity of the air molecule v (m/sec), the viscosity of water η (Pa·sec), the standard pressure $P_s$ (=101325 Pa), the porosity ε (%), and the membrane thickness L (µm) using the following equations:

$$d=2v \times (R_{liq}/R_{gas}) \times (16\eta/3P_s) \times 10^6$$

$$\tau_a=(d \times (\epsilon/100) \times v/(3L \times P_s \times R_{gas}))^{1/2}$$

$R_{gas}$ was determined from the air permeability (sec) using the following equation:

$$R_{gas}=0.0001/(\text{air permeability} \times (6.424 \times 10^{-4}) \times (0.01276 \times 101325))$$

$R_{liq}$ was determined from the water permeability (cm$^3$/(cm$^2$·sec·Pa)) using the following equation:

$$R_{liq}=\text{water permeability}/100$$

The water permeability was determined as follows. A porous membrane immersed in ethanol in advance was set in a stainless steel liquid permeation cell having a diameter of 41 mm. After the ethanol adhering to the membrane was washed with water, water was permeated into the membrane at a differential pressure of approximately 50000 Pa. From the amount of water permeated (cm$^3$) when 120 sec had passed, the amount of water permeated per unit time·unit pressure·unit area was calculated, and was defined as the water permeability.

v was determined from a gas constant R (=8.314), the absolute temperature T(K), the circular constant π, and the average molecular weight M of air (=2.896×10$^{-2}$ kg/mol) using the following equation:

$$v=((8R \times T)/(\pi \times M))^{1/2}$$

The number B of pores (pores/µm$^2$) was determined from the following equation:

$$B=4 \times (\epsilon/100)/(\pi \times d^2 \times \tau_a)$$

(7) Puncture Strength of Porous Membrane

A porous membrane was fixed with a sample holder having an opening with a diameter of 11.3 mm, using a handy compression tester KES-G5 (trademark) made by Kato tech Co., Ltd. Next, the center of the fixed porous membrane was subjected to a puncture test with a needle having a tip with a curvature radius of 0.5 mm at a puncture rate of 2 mm/sec under a 25° C. atmosphere to determine the largest puncture load (gf). The value was multiplied by 25/membrane thickness (µm) to calculate the puncture strength (gf/25 µm) in terms of the membrane thickness of 25 µm.

(8) Membrane Resistance of Porous Membrane

A cut sample having a size of 2.6 cm×2.0 cm was prepared, and was immersed in a methanol solution having 3% by mass nonionic surfactant (made by Kao Corporation, EMULGEN 210P) dissolved therein. The sample was air dried. An aluminum foil having a thickness of 20 µm was cut into a size of 2.0 cm×1.4 cm, and a lead tab was attached to the foil. Two aluminum foils were thus prepared, and the cut sample was sandwiched between the aluminum foils so as to avoid short circuit of the aluminum foil. The sample was impregnated with an electrolytic solution, 1 M LiBF$_4$ propylene carbonate/ethylene carbonate (1/1 in mass ratio). The sample was sealed under reduced pressure in an aluminum laminate pack such that the tabs were projected from the aluminum laminate pack to the outside. Such cells were prepared such that the number of porous membranes in the aluminum foil was one sheet, two sheets, and three sheets. Each of the cells was placed in a 20° C. thermostat, and the resistance of the cell was measured by an alternating current impedance method at an amplitude of 10 mV and a frequency of 100 kHz. The measured resistance value of the cell was plotted against the number of sheet of the porous membranes. The plot was linearly approximated to determine the slope. The slope was multiplied by the area of an electrode, that is, 2.0 cm×1.4 cm to determine the membrane resistance R (Ω·cm$^2$) per sheet of the porous membrane.

(9) Tortuosity of Porous Membrane Determined from Membrane Resistance

From the membrane resistance R (Ω·cm$^2$) and the porosity ε (%) of the porous membrane, the specific resistance ρ (Ω·cm) of the electrolytic solution, and the membrane thickness L (µm) of the porous membrane, the tortuosity of porous membrane was determined using the following equation:

$$\tau_b=\{(R \cdot \epsilon)/(\rho \cdot L)\}^{(1/2)}$$

where the electrolytic solution used was a 1 M LiBF$_4$ propylene carbonate/ethylene carbonate (1/1 in mass ratio) (made by Kishida Chemical Co., Ltd.) at 20° C.; in this case, ρ was 2.663×10$^{-2}$ Ω·cm.

(10) Withstand Voltage of Porous Membrane and Multilayer Porous Membrane

A porous membrane or a multilayer porous membrane was sandwiched between aluminum electrodes having a diameter of 4 cm, and a load of 15 g was applied thereon. The laminate was connected to a withstand voltage measuring apparatus (TOS9201) made by KIKUSUI ELECTRONICS CORPORATION. For the measurement conditions, an AC voltage (60 Hz) was applied at a rate of 1.0 kV/sec, and the voltage value when a short circuit occurred was defined as the withstand voltage (kV) of the porous membrane or the multilayer porous membrane.

(11) Average Particle Size of Resin Binder

The volume average particle size (nm) was measured using a particle size measuring apparatus (MICROTRACT-MUPA150 made by LEED & NORTHRUP Company) according to a light scattering method to define the obtained value as the average particle size.

(12) Thermal Shrinkage Rate (%) at 150° C.

A separator was cut into 100 mm in the MD and 100 mm in the TD, and left as it was in a 150° C. oven for 1 hour. At this time, the sample was sandwiched between two sheets of paper so as not to be exposed to warm air directly. The sample was taken out from the oven to be cooled. The length (mm) of the sample was measured, and the thermal shrinkage rates in the MD and in the TD were calculated by the following equations.

MD thermal shrinkage rate (%)=(100−length of MD after heating)/100×100

TD thermal shrinkage rate (%)=(100−length of TD after heating)/100×100

(13) Shutdown Temperature and Short-Circuit Temperature of Multilayer Porous Membrane a. Production of Positive Electrode 92.2 parts by mass of lithium cobalt complex oxide (LiCoO$_2$) as a positive electrode active substance, 2.3 parts by mass of flake graphite and 2.3 parts by mass of acetylene black as an electric conduction material, and 3.2 parts by mass of polyvinylidene fluorides (PVDF) as a resin binder were provided. These were dispersed in N-methylpyrrolidone (NMP) to prepare a slurry. Using a die coater, this slurry was applied onto one surface of an aluminum foil having a thickness of 20 μm and serving as a positive electrode collector such that the amount of the positive electrode active substance to be applied was 250 g/m$^2$. After drying at 130° C. for 3 minutes, using a roll press machine, the product was compression-formed such that the bulk density of the positive electrode active substance was 3.00 g/cm$^3$. Thus, a positive electrode was obtained.

b. Production of Negative Electrode 96.6 parts by mass of artificial graphite as a negative electrode active substance, and 1.4 parts by mass of an ammonium salt of carboxymethyl cellulose and 1.7 parts by mass of a styrene-butadiene copolymer latex as a resin binder were provided. These were dispersed in purified water to prepare a slurry. Using a die coater, this slurry was applied onto one surface of a copper foil having a thickness of 12 μm and serving as a negative electrode collector such that the amount of the negative electrode active substance to be applied was 106 g/m$^2$. After drying at 120° C. for 3 minutes, using a roll press machine, the product was compression-formed such that the bulk density of the negative electrode active substance was 1.35 g/cm$^3$. Thus, a negative electrode was obtained.

c. Preparation of Nonaqueous Electrolytic Solution

LiBF$_4$ as a solute was dissolved at a concentration of 1.0 mol/L in a mixed solvent of propylene carbonate:ethylene carbonate:γ-butyllactone=1:1:2 (volume ratio), to prepare a nonaqueous electrolytic solution.

d. Measurement of Shutdown Temperature and Short-Circuit Temperature

A negative electrode cut into 65 mm×20 mm and immersed in the nonaqueous electrolytic solution for not less than 1 minute, an aramid film of 9 μm (thickness)×50 mm×50 mm having a hole with a diameter 16 mm in the central portion thereof, a multilayer porous membrane or porous membrane cut into 65 mm×20 mm and immersed in the nonaqueous electrolytic solution for not less than 1 hour, a positive electrode cut into 65 mm×20 mm and immersed in the nonaqueous electrolytic solution for not less than 1 minute, a Kapton film, and a silicone rubber having a thickness of approximately 4 mm were provided, and laminated in the above order on a ceramic plate having a thermocouple connected thereto. This laminated body was set on a hot plate. While a pressure of 4.1 MPa was applied to the laminated body by a hydraulic press machine, the temperature was raised at the rate of 15° C./min. Change in the impedance between the positive electrode and the negative electrode was measured to 200° C. under the conditions of a 1 V and 1 kHz alternating current.

The shutdown temperature was defined as a temperature at which the impedance reached 1000Ω. The short-circuit temperature was defined as a temperature at which the impedance fell below 1000Ω again after shutdown.

(14) Rate Capability of Multilayer Porous Membrane a. Production of Positive Electrode 91.2 Parts by mass of lithium nickel manganese cobalt complex oxide (Li[Ni$_{1/3}$Mn$_{1/3}$Co$_{1/3}$]O$_2$) as a positive electrode active substance, 2.3 parts by mass of flake graphite and 2.3 parts by mass of acetylene black as electric conductive materials, and 4.2 parts by mass of polyvinylidene fluoride (PVDF) as a resin binder were provided. These were dispersed in N-methyl pyrrolidone (NMP) to prepare a slurry. The slurry was applied onto one surface of an aluminum foil having a thickness of 20 μm and serving as a positive electrode collector with a die coater such that the amount of the positive electrode active substance applied was 120 g/m$^2$. The coating was dried at 130° C. for 3 minutes. The product was then compression-formed with a roll press such that the bulk density of the positive electrode active substance was 2.90 g/cm$^2$. A positive electrode was prepared. Thus, a positive electrode was punched into a circle having an area of 2.00 cm$^2$.

b. Production of Negative Electrode 96.6 Parts by mass of artificial graphite as a negative electrode active substance, and 1.4 parts by mass of ammonium salt of carboxymethyl cellulose and 1.7 parts by mass of a styrene-butadiene copolymer latex as resin binders were provided. These were dispersed in purified water to prepare a slurry. The slurry was applied onto one surface of a copper foil having a thickness of 16 μm and serving as a negative electrode collector with a die coater such that the amount of the negative electrode active substance applied was 53 g/m$^2$. After drying at 120° C. for 3 minutes, the product was then compression-formed with a roll press such that the bulk density of the negative electrode active substance was 1.35 g/cm$^2$. Thus, a negative electrode was prepared. The negative electrode was punched into a circle having an area of 2.05 cm$^2$.

c. Nonaqueous Electrolytic Solution

LiPF$_6$ as a solute was dissolved at a concentration of 1.0 ml/L in a mixed solvent of ethylene carbonate:ethylmethyl carbonate=1:2 (volume ratio) to prepare a nonaqueous electrolytic solution.

d. Assembly of Battery

The negative electrode, the multilayer porous membrane, and the positive electrode were laminated in this order such that the active substance surface of the positive electrode faces that of the negative electrode. This laminated body was placed in a stainless steel metal container with a cover such that the copper foil of the negative electrode and the aluminum foil of the positive electrode contact the main body of the container and the cover, respectively. The main body of the container is insulated from the cover of the container. The nonaqueous electrolytic solution was injected into this container, and the container was sealed.

e. Evaluation of Rate Capability

A simple battery assembled in d. was charged to a cell voltage of 4.2 V at a current value of 3 mA (approximately 0.5 C) at 25° C. Reduction of the current value was started from 3 mA such that 4.2 V was maintained. In such a manner, initial charging after production of the battery was performed for approximately 6 hours in total, and then, discharging was performed to a cell voltage of 3.0 V at a current value of 3 mA.

Next, charging was performed to a cell voltage of 4.2 V at a current value of 6 mA (approximately 1.0 C) at 25° C. Reduction of the current value was started from 6 mA such that 4.2 V was maintained. In such a manner, charging was performed for approximately 3 hours in total, and then, discharging was performed to a cell voltage of 3.0 V at a current value of 6 mA. The discharge capacity at the time was defined as 1 C discharge capacity (mAh).

Next, charging was performed to a cell voltage of 4.2 V at a current value of 6 mA (approximately 1.0 C) at 25° C.

Reduction of the current value was started from 6 mA such that 4.2 V was maintained. In such a manner, charging was performed for approximately 3 hours in total, and then, discharging was performed to a cell voltage of 3.0 V with at current value of 12 mA (approximately 2 C). The discharge capacity at the time was defined as 2 C discharge capacity (mAh).

Next, the battery was charged to a cell voltage of 4.2 V at 25° C. and a current value of 6 mA (approximately 1.0 C). Reduction of the current value was started from 6 mA such that 4.2 V was maintained. In such a manner, the battery was charged for approximately 3 hours in total. Subsequently, the battery was discharged at a current value of 60 mA (approximately 10 C) to a cell voltage of 3.0 V. The discharge capacity at this time was defined as the 10 C discharge capacity (mAh).

The proportion of 2 C discharge capacity to 1 C discharge capacity was calculated, and this value was defined as the rate capability at 2 C.

2 C rate capability (%)=(2 C discharge capacity/1 C discharge capacity)×100

2 C rate reduction rate (%)={(2 C rate capability of porous membrane used)−(2 C rate capability of multilayer porous membrane)}/(2 C rate capability of porous membrane used)×100

The proportion of a 10 C discharge capacity to a 1 C discharge capacity was calculated, and the value was defined as the rate capability at 10 C.

10 C rate capability (%)=(10 C discharge capacity/1 C discharge capacity)×100

10 C rate reduction rate (%)={(10C rate capability of porous membrane used)−(10 C rate capability of multilayer porous membrane)}/(10 C rate capability of porous membrane used)×100

Example 1

47.5 parts by mass of a homopolymer polyethylene having an Mv of 700,000, 47.5 parts by mass of a homopolymer polyethylene having an Mv of 250,000, and 5 parts by mass of a homopolymer polypropylene having an Mv of 400,000 were dry blended using a tumbler blender. 1 part by mass of pentaerythrityl-tetrakis-[3-(3,5-di-t-butyl-4-hydroxyphenyl) propionate] was added as an antioxidant to 99 parts by mass of the obtained a polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of 7.59× $10^{-5}$ m$^2$/s at 37.78° C.) was injected into a cylinder of the extruder by a plunger pump.

The feeder and the pump were adjusted such that the ratio of the amount of liquid paraffin to the mixture of all the components melt kneaded and extruded was 67% by mass (resin composition content: 33% by mass). For the melt kneading conditions, a preset temperature was 200° C., a screw rotation speed was 100 rpm, and an amount of discharge was 12 kg/h.

Then, the melt kneaded product was extruded through a T die and cast onto a cooling roll, whose surface temperature was controlled to be 25° C., to obtain a gel sheet having a thickness of 1600 μm.

Next, the gel sheet was guided to a simultaneous biaxial tenter stretching machine to be subjected to biaxial stretching. For the stretching condition settings, the MD magnification was 7.0 times, the TD magnification was 6.1 times, and a preset temperature was 121° C.

Next, the sheet was guided to a tank of methyl ethyl ketone, and was sufficiently immersed in methyl ethyl ketone to remove liquid paraffin by extraction. Subsequently methyl ethyl ketone was removed by drying.

Next, the sheet was guided to a TD tenter, and was subjected to heat setting. The heat setting temperature was 120° C., the largest TD magnification was 2.0 times, and the relaxation rate was 0.90. As a result, a polyolefin resin porous membrane having: a membrane thickness of 17 μm; a porosity of 60%; an air permeability of 84 seconds/100 cc; an average pore size d=0.057 μm, a tortuosity τa=1.45, and the number B of pores=165 pores/μm$^2$, which were determined by the gas-liquid method; and a puncture strength of 567 gf in terms of 25 μm, was obtained.

Next, 95.0 parts by mass of calcined kaolin prepared by calcining wet kaolin (kaolinite ($Al_2Si_2O_5(OH)_4$) as a main component) at a high temperature (average particle size: 1.8 μm), 5.0 parts by mass of an acrylic latex (solid content: 40%, average particle size: 220 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a gravure coater. Water was removed by drying at 60° C. to obtain a multilayer porous membrane including the polyolefin resin porous membrane and a porous layer having a thickness of 7 μm and formed on the polyolefin resin porous membrane.

Example 2

A polyolefin resin porous membrane having: a membrane thickness of 18 μm; a porosity of 64%; an air permeability 78 seconds/100 cc; an average pore size d=0.055 μm, tortuosity τa=1.38, and the number B of pores=191 pores/μm$^2$, which were determined by the gas-liquid method; and a puncture strength of 542 gf in terms of 25 μm, was obtained in the same manner as that in Example 1 except that the melt kneaded product was cast through the T die to obtain a gel sheet having a thickness of 1550 μm, and a preset temperature for biaxial stretching with the simultaneous biaxial tenter stretching machine was 119° C.

Next, 96.0 parts by mass of aluminum hydroxide oxide (average particle size: 1.0 μm), 4.0 parts by mass of an acrylic latex (solid content: 40%, average particle size: 145 nm, lowest membrane forming temperature: 0° C. or less), and 1.0 part by mass of an aqueous solution of ammonium polycarboxylate (SN-DISPERSANT 5468 made by SAN NOPCO Limited) were uniformly dispersed in 100 parts by mass of water to prepare a coating solution. The coating solution was applied to the surface of the polyolefin resin porous membrane with a micro gravure coater. The membrane was dried at 60° C. to remove water to obtain a multilayer porous membrane including the polyolefin resin porous membrane and a porous layer having a thickness of 7 μm formed on the polyolefin resin porous membrane.

Example 3

A polyolefin resin porous membrane having: a membrane thickness of 15 μm; a porosity of 60%; an air permeability of 90 seconds/100 cc; an average pore size d=0.056 μm, a tortuosity τa=1.54, and the number B of pores=157 pores/μm², which were determined by the gas-liquid method; and a puncture strength of 600 gf in terms of 25 μm, was obtained in the same manner as that in Example 1 except that the melt kneaded product was cast through the T die to obtain a gel sheet having a thickness of 1400 μm, a preset temperature for biaxial stretching with the simultaneous biaxial tenter stretching machine was 119° C., the heat setting temperature in the TD tenter was 128° C., the largest TD magnification was 2.0 times, and the relaxation rate was 0.88.

Next, 95.0 parts by mass of calcined kaolin prepared by calcining wet kaolin(kaolinite ($Al_2Si_2O_5(OH)_4$) as a main component) at a high temperature (average particle size: 1.8 μm), 5.0 parts by mass of an acrylic latex (solid content: 40%, average particle size: 145 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a micro gravure coater. Water was removed by drying at 60° C. to obtain a multilayer porous membrane including the polyolefin resin porous membrane and a porous layer having a thickness of 6 μm and formed on the polyolefin resin porous membrane.

Example 4

A polyolefin resin porous membrane having: a membrane thickness of 13 μm; a porosity of 64%; an air permeability 65 seconds/100 cc; an average pore size d=0.050 μm, tortuosity τa=1.41, and the number B of pores=222 pores/μm², which were determined by the gas-liquid method; and a puncture strength of 618 gf in terms of 25 μm, was obtained in the same manner as that in Example 1 except that the melt kneaded product was cast through the T die to obtain a gel sheet having a thickness of 1150 μm, and a preset temperature for biaxial stretching with the simultaneous biaxial tenter stretching machine was 120° C.

Next, 95.0 parts by mass of calcined kaolin prepared by calcining wet kaolin (kaolinite ($Al_2Si_2O_5(OH)_4$) as a main component) at a high temperature (average particle size: 1.1 μm), 5.0 parts by mass of an acrylic latex (solid content: 40%, average particle size: 145 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a micro gravure coater. Water was removed by drying at 60° C. to obtain a multilayer porous membrane including the polyolefin resin porous membrane and a porous layer having a thickness of 5 μm and formed on the polyolefin resin porous membrane.

Example 5

A polyolefin resin porous membrane having: a membrane thickness of 17 μm; a porosity of 57%; an air permeability of 132 seconds/100 cc; an average pore size d=0.052 μm, a tortuosity τa=1.64, and the number B of pores=163 pores/μm², which were determined by the gas-liquid method; and a puncture strength of 788 gf in terms of 25 μm, was obtained in the same manner as that in Example 1 except that the melt kneaded product was cast through the T die to obtain a gel sheet having a thickness of 1700 μm, a preset temperature for biaxial stretching with the simultaneous biaxial tenter stretching machine was 117° C., the heat setting temperature in the TD tenter was 117° C.

Next, 96.0 parts by mass of calcined kaolin prepared by calcining wet kaolin (kaolinite ($Al_2Si_2O_5(OH)_4$) as a main component) at a high temperature (average particle size: 1.1 μm), 4.0 parts by mass of an acrylic latex (solid content: 40%, average particle size: 145 nm, lowest membrane forming temperature: 0° C. or less), and 1.0 part by mass of an aqueous solution of ammonium polycarboxylate (SN-DISPERSANT 5468 made by SAN NOPCO Limited) were uniformly dispersed in 100 parts by mass of water to prepare a coating solution. The coating solution was applied onto the surface of the polyolefin resin porous membrane with a gravure coater. Water was removed by drying at 60° C. to obtain a multilayer porous membrane including the polyolefin resin porous membrane and a porous layer having a thickness of 7 μm and formed on the polyolefin resin porous membrane.

Example 6

A polyolefin resin porous membrane having: a membrane thickness of 12 μm; a porosity of 65%; an air permeability of 61 seconds/100 cc; an average pore size d=0.043 μm, a tortuosity τa=1.36, and the number B of pores=325 pores/μm², which were determined by the gas-liquid method; and a puncture strength of 678 gf in terms of 25 μm, was obtained in the same manner as that in Example 1 except that the melt kneaded product (the ratio of the amount of liquid paraffin to the mixture of all the components melt kneaded and extruded was 68% by mass; resin composition content: 32% by mass) was cast through the T die to obtain a gel sheet having a thickness of 1050 μm, a preset temperature for biaxial stretching with the simultaneous biaxial tenter stretching machine was 120° C., and the heat setting temperature in the TD tenter was 119° C.

Next, 96.5 parts by mass of aluminum oxide (average particle size: 1.0 μm), and 3.5 parts by mass of an acrylic latex (solid content: 40%, average particle size: 145 nm, lowest membrane forming temperature: 0° C. or less) were uniformly dispersed in 150 parts by mass of water to prepare a coating solution. The coating solution was applied onto the surface of the polyolefin resin porous membrane with a micro gravure coater. Water was removed by drying at 60° C. to obtain a multilayer porous membrane including a polyolefin resin porous membrane and a porous layer having a thickness of 6 μm and formed on the polyolefin resin porous membrane.

Example 7

95 parts by mass of a homopolymer polyethylene having an Mv of 250,000 and 5 parts by mass of a homopolymer polyethylene having an Mv of 400,000 were dry blended using a tumbler blender. 1 part by mass of pentaerythrityl-tetrakis-[3-(3,5-di-t-butyl-4-hydroxyphenyl)propionate] as an antioxidant was added to 99 parts by mass of the obtained polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of 7.59×10$^{-5}$ m$^2$/s at 37.78° C.) was injected into a cylinder of the extruder by a plunger pump.

The feeder and the pump were adjusted such that the ratio of the amount of liquid paraffin to the mixture of all the components melt kneaded and extruded was 62% by mass (resin composition content: 38% by mass). For the melt kneading conditions, a preset temperature was 200° C., a screw rotation speed was 100 rpm, and an amount of discharge was 12 kg/h.

Then, the melt kneaded product was extruded through a T die and cast onto a cooling roll, whose surface temperature was controlled to be 25° C., to obtain a gel sheet having a thickness of 1200 μm.

Next, the gel sheet was guided to a simultaneous biaxial tenter stretching machine to be subjected to biaxial stretching. For the stretching condition settings, the MD magnification was 7.0 times, the TD magnification was 5.0 times, and a preset temperature was 123° C.

Next, the sheet was guided to a tank of methyl ethyl ketone, and was sufficiently immersed in methyl ethyl ketone to remove liquid paraffin by extraction. Subsequently methyl ethyl ketone was removed by drying.

Next, the sheet was guided to a TD tenter, and was subjected to heat setting. The heat setting temperature was 125° C., the largest TD magnification was 3.5 times, and the relaxation rate was 0.94. As a result, a polyolefin resin porous membrane having: a membrane thickness of 11 μm; a porosity of 67%; an air permeability of 40 seconds/100 cc; an average pore size d=0.056 μm, a tortuosity τa=1.25, and the number B of pores=223 pores/μm$^2$, which were determined by the gas-liquid method; and a puncture strength of 658 gf in terms of 25 μm, was obtained.

Next, 96.0 parts by mass of aluminum hydroxide oxide (average particle size: 1.0 μm), 4.0 parts by mass of an acrylic latex (solid content: 40%, average particle size: 140 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a gravure coater. The membrane was dried at 60° C. to remove water to obtain a multilayer porous membrane including the polyolefin resin porous membrane and a porous layer having a thickness of 5 μm formed on the polyolefin resin porous membrane.

Example 8

96.0 Parts by mass of aluminum hydroxide oxide (average particle size: 1.0 μm), 4.0 parts by mass of an acrylic latex (solid content: 40%, average particle size: 140 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto one surface of the polyolefin resin porous membrane obtained in Example 6 with a micro gravure coater, and was dried at 60° C. to remove water. The coating solution was then applied onto the other surface of the membrane with the micro gravure coater. Water was removed by drying at 60° C. to obtain a multilayer porous membrane including a polyolefin resin porous membrane and porous layers having a thickness of 6 μm and formed on both surfaces of the polyolefin resin porous membrane.

Example 9

A multilayer porous membrane was obtained by the same method as that in Example 1 except that a micro gravure coater and a dryer were arranged in series immediately after the heat setting apparatus, the polyolefin resin porous membrane after heat setting was directly guided to the micro gravure coater without winding the membrane, and the coating solution was applied onto the surface of the polyolefin porous membrane, and was dried.

Example 10

28.5 Parts by mass of copolymerized polyethylene having an My of 150000 (comonomer: propylene, content of propylene monomer unit: 0.6 mol %, density: 0.95), 28.5 parts by mass of high density homopolyethylene having an Mv of 300000, 14.2 parts by mass of high density homopolyethylene having an Mv of 700000, 23.8 parts by mass of ultra high molecular weight homopolyethylene having an Mv of 2000000, and 5 parts by mass of homopolymer polypropylene were dry blended with a tumbler blender.

As an antioxidant, 1 part by mass of pentaerythrityl-tetrakis-[3-(3,5-di-t-butyl-4-hydroxyphenyl)propionate] was added to 99 parts by mass of the obtained polymer mixture, and was dry blended again with the tumbler blender to obtain a mixture of the polymers and the like. After replacement by nitrogen, the obtained mixture of the polymers and the like was fed to a twin screw extruder under a nitrogen atmosphere with a feeder. Liquid paraffin (kinematic viscosity at 37.78° C.: 7.59×10$^{-5}$ m$^2$/s) was injected into an extruder cylinder with a plunger pump.

The feeder and the pump were adjusted such that the ratio of the amount of liquid paraffin to the mixture of all the components melt kneaded and extruded was 62% by mass (resin composition content: 38% by mass). For the melt kneading conditions, a preset temperature was 200° C., a screw rotation speed was 100 rpm, and an amount of discharge was 12 kg/h.

Then, the melt kneaded product was extruded through a T die and cast onto a cooling roll, whose surface temperature was controlled to be 25° C., to obtain a gel sheet having a thickness of 1600 μm.

Next, the gel sheet was guided to a simultaneous biaxial tenter stretching machine to be subjected to biaxial stretching. For the stretching condition settings, the MD magnification was 7.0 times, the TD magnification was 6.1 times, and a preset temperature was 123° C.

Next, the sheet was guided to a tank of methyl ethyl ketone, and was sufficiently immersed in methyl ethyl ketone to remove liquid paraffin by extraction. Subsequently methyl ethyl ketone was removed by drying.

Next, the sheet was guided to a TD tenter, and subjected to heat setting. The heat setting temperature was 117° C., the largest TD magnification was 2.0 times, and the relaxation rate was 0.90. As a result, a polyolefin resin porous membrane having: a membrane thickness of 18 μm; a porosity of 57%; an air permeability of 116 seconds/100 cc; an average pore size d=0.057 μm, a tortuosity τa=1.61, and the number B of pores=138 pores/μm$^2$, which were determined by the gas-liquid method; and a puncture strength of 506 gf in terms of 25 μm, was obtained.

The same porous layer as that in Example 1 was formed on the surface of the polyolefin resin porous membrane to obtain a multilayer porous membrane.

Example 11

96.0 parts by mass of aluminum hydroxide oxide (average particle size: 1.0 μm), 4.0 parts by mass of an acrylic latex (solid content: 40%, average particle size: 140 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane obtained in Example 10 with a gravure coater. The membrane was dried at 60° C. to remove water to obtain a multilayer porous membrane including the polyolefin resin porous membrane and a porous layer having a thickness of 6 μm formed on the polyolefin resin porous membrane.

Comparative Example 1

40.5 parts by mass of high density polyethylene (weight average molecular weight: 250000, molecular weight distribution: 7, density: 0.956), 4.5 parts by mass of linear copolymerized polyethylene (melt index: 0.017, density: 0.930, propylene content: 1.6 mol %), 55 parts by mass of liquid paraffin, and 0.3 parts by mass (based on the polyethylene) of tetrakis-[methylene-3-(3',5'-di-t-butyl-4'-hydroxyphenyl)propionate]methane were kneaded with a biaxial extruder to prepare a polymer solution. The obtained polymer solution was cast from a hanger coat die having a lip clearance of 1.8 mm to a cooling roll to obtain a sheet having a thickness of 1.8 mm. The obtained sheet was stretched 7×4 times before extraction with a simultaneous biaxial tenter stretching machine at a stretching temperature of 120° C., and subsequently was immersed in methylene chloride to remove liquid paraffin by extraction. The sheet was stretched after extraction 2.8 times in the traverse direction at a stretching temperature of 110° C. with a tenter stretching machine. Then while the stretching in the traverse direction was 35% relaxed, the sheet was subjected to a heat treatment. As a result, a polyolefin resin porous membrane having: a membrane thickness of 26 μm; a porosity of 65%; an air permeability of 75 seconds/100 cc; an average pore size d=0.060 μm, a tortuosity τa=1.18, and the number B of pores=195 pores/μm², which were determined by the gas-liquid method; and a puncture strength of 339 gf in terms of 25 μm, was obtained.

The same porous layer as that in Example 2 was formed on the surface of the polyolefin resin porous membrane to obtain a multilayer porous membrane.

Comparative Example 2

A polyolefin resin porous membrane having: a membrane thickness of 30 μm; a porosity of 57%; an air permeability of 172 seconds/100 cc; an average pore size d=0.050 μm, a tortuosity τa=1.43, and the number B of pores=203 pores/μm², which were determined by the gas-liquid method; and a puncture strength of 415 gf in terms of 25 μm, was obtained in the same manner as that in Comparative Example 1 except that 28 parts by mass of high density polyethylene (weight average molecular weight: 250000, molecular weight distribution: 7, density: 0.956), 12 parts by mass of linear copolymerized polyethylene (melt index: 0.017, density: 0.930, propylene content: 1.6 mol %), 60 parts by mass of liquid paraffin, and 0.3 parts by mass (based on the polyethylene) of tetrakis-[methylene-3-(3',5'-di-t-butyl-4'-hydroxyphenyl)propionate]methane were stretched before extraction 7×7 times, and stretched after extraction 1.87 times, and the relaxation rate was 10%.

The same porous layer as that in Example 2 was formed on the surface of the polyolefin resin porous membrane to obtain a multilayer porous membrane.

Comparative Example 3

47.5 parts by mass of homopolymer polyethylene having an Mv of 700000, 47.5 parts by mass of homopolymer polyethylene having an Mv of 250000, and 5 parts by mass of homopolymer polypropylene having an My of 400000 were dry blended with a tumbler blender. As an antioxidant, 1 part by mass of pentaerythrityl-tetrakis-[3-(3,5-di-t-butyl-4-hydroxyphenyl)propionate] was added to 99 parts by mass of the obtained polymer mixture, and was dry blended again with the tumbler blender to obtain a mixture of the polymers and the like. After replacement by nitrogen, the obtained mixture of the polymers and the like was fed to a twin screw extruder under a nitrogen atmosphere with a feeder. As a plasticizer, liquid paraffin (kinematic viscosity at 37.78° C.: 7.59×10⁻⁵ m²/s) was injected into an extruder cylinder with a plunger pump. The feeder and the pump were adjusted such that the ratio of the amount of liquid paraffin to the mixture of all the components melt kneaded and extruded was 65% by mass. For the melt kneading conditions, a preset temperature was 200° C., a screw rotation speed was 240 rpm, and an amount of discharge was 12 kg/h.

Then, the melt kneaded product was extruded through a T die and cast onto a cooling roll, whose surface temperature was controlled to be 25° C., to obtain a sheet-like polyolefin composition having a thickness of 1300 μm.

Next, the sheet was guided to a simultaneous biaxial tenter stretching machine, and was subjected to simultaneous biaxial stretching of 7 times in MD and 6.4 times in TD. At this time, a preset temperature in the simultaneous biaxial tenter was 118° C. Next, the sheet was guided to a tank of methyl ethyl ketone to remove liquid paraffin by extraction. Thereafter, methyl ethyl ketone was removed by drying.

Next, the sheet was guided to a TD tenter, and subjected to heat setting. The heat setting temperature was 122° C., the largest TD magnification was 1.4 times, and the relaxation rate was 0.85. As a result, a polyolefin resin porous membrane having: a membrane thickness of 16 μm; a porosity of 47%; an air permeability of 163 seconds/100 cc; an average pore size d=0.058 μm, a tortuosity τa=1.86, and the number B of pores=91 pores/μm², which were determined by the gas-liquid method; and a puncture strength of 525 gf in terms of 25 μm, was obtained.

Next, 95.0 parts by mass of calcined kaolin prepared by calcining wet kaolin(kaolinite ($Al_2Si_2O_5(OH)_4$) as a main component) at a high temperature (average particle size: 1.8 μm), 5.0 parts by mass of an acrylic latex (solid content: 40%, average particle size: 220 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a micro gravure coater. Water was removed by drying at 60° C. to obtain a multilayer porous membrane including the polyolefin resin porous membrane and a porous layer having a thickness of 7 μm and formed on the polyolefin resin porous membrane.

Comparative Example 4

47 parts by mass of homopolymer polyethylene having an Mv of 700000, 46 parts by mass of homopolymer polyethylene having an Mv of 250000, and 7 parts by mass of homopolymer polypropylene having an Mv of 400000 were dry blended with a tumbler blender. As an antioxidant, 1 part by mass of pentaerythrityl-tetrakis-[3-(3,5-di-t-butyl-4-hydroxyphenyl)propionate] was added to 99 parts by mass of the obtained polymer mixture, and was dry blended again with the tumbler blender to obtain a mixture of the polymers and the like. After replacement by nitrogen, the obtained mixture of the polymers and the like was fed to a twin screw extruder under a nitrogen atmosphere with a feeder. As a plasticizer, liquid paraffin (kinematic viscosity at 37.78° C.: $7.59 \times 10^{-5}$ m$^2$/s) was injected into an extruder cylinder with a plunger pump. The feeder and the pump were adjusted such that the ratio of the amount of liquid paraffin to the mixture of all the components melt kneaded and extruded was 65% by mass. For the melt kneading conditions, a preset temperature was 200° C., a screw rotation speed was 240 rpm, and an amount of discharge was 12 kg/h.

Then, the melt kneaded product was extruded through a T die and cast onto a cooling roll, whose surface temperature was controlled to be 25° C., to obtain a sheet-like polyolefin composition having a thickness of 2000 μm.

Next, the sheet was guided to a simultaneous biaxial tenter stretching machine, and was subjected to simultaneous biaxial stretching of 7 times in MD and 7 times in TD. At this time, a preset temperature in the simultaneous biaxial tenter was 125° C. Next, the sheet was guided to a tank of methyl ethyl ketone to remove liquid paraffin by extraction. Thereafter, methyl ethyl ketone was removed by drying.

Next, the sheet was guided to a TD tenter, and subjected to heat setting. The heat setting temperature was 133° C., the largest TD magnification was 1.9 times, and the relaxation rate was 0.84. As a result, a polyolefin resin porous membrane having: a membrane thickness of 16 μm; a porosity of 41%; an air permeability of 157 seconds/100 cc; an average pore size d=0.085 μm, a tortuosity τa=2.10, and the number B of pores=36 pores/μm$^2$, which were determined by the gas-liquid method; and a puncture strength of 572 gf in terms of 25 μm, was obtained.

Next, 95.0 parts by mass of calcined kaolin prepared by calcining wet kaolin(kaolinite (Al$_2$Si$_2$O$_5$(OH)$_4$) as a main component) at a high temperature (average particle size: 1.8 μm), 5.0 parts by mass of an acrylic latex (solid content: 40%, average particle size: 145 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a gravure coater. Water was removed by drying at 60° C. to obtain a multilayer porous membrane including the polyolefin resin porous membrane and a porous layer having a thickness of 6 μm and formed on the polyolefin resin porous membrane.

Comparative Example 5

A polyolefin resin porous membrane having: a membrane thickness of 20 μm; a porosity of 41%; an air permeability of 283 seconds/100 cc; an average pore size d=0.069 μm, a tortuosity τa=2.29, and the number B of pores=50 pores/μm$^2$, which were determined by the gas-liquid method; and a puncture strength 760 gf in terms of 25 μm, was obtained in the same manner as that in Comparative Example 4 except that the heat setting temperature in the TD tenter was 125° C., the largest TD magnification was 1.6 times, and the relaxation rate was 0.80.

The same porous layer as that in Comparative Example 3 was formed on the surface of the polyolefin resin porous membrane to obtain a multilayer porous membrane.

Comparative Example 6

A porous membrane was obtained in the same manner as that in Example 1 except that no porous layer was formed.

Comparative Example 7

A porous membrane was obtained in the same manner as that in Example 2 except that no porous layer was formed.

Comparative Example 8

A porous membrane was obtained in the same manner as that in Example 3 except that no porous layer was formed.

Comparative Example 9

A porous membrane was obtained in the same manner as that in Example 4 except that no porous layer was formed.

Comparative Example 10

A porous membrane was obtained in the same manner as that in Example 5 except that no porous layer was formed.

Comparative Example 11

A porous membrane was obtained in the same manner as that in Example 6 except that no porous layer was formed.

Comparative Example 12

A porous membrane was obtained in the same manner as that in Example 7 except that no porous layer was formed.

Comparative Example 13

A porous membrane was obtained in the same manner as that in Comparative Example 1 except that no porous layer was formed.

Comparative Example 14

A porous membrane was obtained in the same manner as that in Comparative Example 2 except that no porous layer was formed.

Comparative Example 15

A porous membrane was obtained in the same manner as that in Comparative Example 3 except that no porous layer was formed.

Comparative Example 16

A porous membrane was obtained in the same manner as that in Comparative Example 4 except that no porous layer was formed.

Comparative Example 17

A porous membrane was obtained in the same manner as that in Comparative Example 5 except that no porous layer was formed.

Comparative Example 18

A porous membrane was obtained in the same manner as that in Example 10 except that no porous layer was formed.

The physical properties and the results of evaluation of the porous membranes, the porous layers, and the multilayer porous membranes in Examples and Comparative Examples are shown in Table 1 and Table 2 below.

TABLE 1

| | Porous membrane | | | | | | | | | | Porous layer | | |
|---|---|---|---|---|---|---|---|---|---|---|---|---|---|
| | Membrane thickness L µm | Porosity ε % | Air permeability sec/100 cc | Average pore size d µm | Tortuosity τa | Number B of pores pores/µm² | Puncture strength gf | Puncture strength in terms of 25 µm gf/25 µm | Membrane resistance R Ω·cm² | Withstand voltage kV | Tortuosity determined from membrane resistance τb | Inorganic filler | Binder | Layer thickness µm |
| Example 1 | 17 | 60 | 84 | 0.057 | 1.45 | 165 | 385 | 567 | 1.0 | 1.3 | 1.15 | Calcined kaolin | LTX | 7 |
| Example 2 | 18 | 64 | 78 | 0.055 | 1.38 | 191 | 399 | 542 | 0.9 | 1.4 | 1.08 | Aluminum hydroxide oxide | LTX | 7 |
| Example 3 | 15 | 60 | 90 | 0.056 | 1.54 | 157 | 367 | 600 | 0.9 | 1.3 | 1.15 | Calcined kaolin | LTX | 6 |
| Example 4 | 13 | 64 | 65 | 0.050 | 1.41 | 222 | 331 | 618 | 0.7 | 1.2 | 1.11 | Calcined kaolin | LTX | 5 |
| Example 5 | 17 | 57 | 132 | 0.052 | 1.64 | 163 | 525 | 788 | 1.1 | 1.4 | 1.19 | Calcined kaolin | LTX | 7 |
| Example 6 | 12 | 65 | 61 | 0.043 | 1.36 | 325 | 328 | 678 | 0.7 | 0.9 | 1.18 | Aluminum oxide | LTX | 6 |
| Example 7 | 11 | 67 | 40 | 0.056 | 1.25 | 223 | 300 | 658 | 0.6 | 0.9 | 1.14 | Aluminum hydroxide oxide | LTX | 5 |
| Example 8 | 12 | 65 | 61 | 0.043 | 1.36 | 325 | 328 | 678 | 0.7 | 0.9 | 1.18 | Calcined kaolin | LTX | 6 + 6 |
| Example 9 | 17 | 60 | 84 | 0.057 | 1.45 | 165 | 385 | 567 | 1.0 | 1.3 | 1.15 | Calcined kaolin | LTX | 7 |
| Example 10 | 18 | 57 | 116 | 0.057 | 1.61 | 138 | 364 | 506 | 1.0 | 1.3 | 1.15 | Calcined kaolin | LTX | 7 |
| Example 11 | 18 | 57 | 116 | 0.057 | 1.61 | 138 | 364 | 506 | 1.0 | 1.3 | 1.15 | Aluminum hydroxide oxide | LTX | 6 |

| | Multilayer porous membrane | | | | | | | | | | |
|---|---|---|---|---|---|---|---|---|---|---|---|
| | Total thickness µm | Air permeability sec/100 cc | Withstand voltage kV | Thermal shrinkage rate at 150° C. MD % | Thermal shrinkage rate at 150° C. TD % | Shutdown temperature ° C. | Short-circuit temperature ° C. | 2C rate capability % | 2C rate reduction rate % | 10C rate capability % | 10C rate reduction rate % |
| Example 1 | 24 | 88 | 1.3 | 1 | 1 | 145 | >200 | 96 | 0 | 67 | 3 |
| Example 2 | 25 | 85 | 1.4 | 1 | 1 | 145 | >200 | 96 | 0 | 69 | 4 |
| Example 3 | 21 | 92 | 1.4 | 1 | 2 | 145 | >200 | 96 | 0 | 73 | 1 |
| Example 4 | 18 | 67 | 1.3 | 2 | 2 | 145 | >200 | 96 | 0 | 74 | 1 |
| Example 5 | 24 | 150 | 1.4 | 2 | 2 | 145 | >200 | 95 | 0 | 62 | 5 |
| Example 6 | 18 | 72 | 1.0 | 1 | 2 | 145 | >200 | 95 | 1 | 70 | 7 |
| Example 7 | 16 | 45 | 1.0 | 1 | 1 | 144 | >200 | 97 | 0 | 74 | 4 |
| Example 8 | 24 | 71 | 1.1 | 1 | 1 | 145 | >200 | 96 | 0 | 71 | 5 |

TABLE 1-continued

| | | | | | | | | | | | |
|---|---|---|---|---|---|---|---|---|---|---|---|
| Example 9 | 24 | 87 | 1.3 | 1 | 1 | 145 | >200 | 96 | 0 | 68 | 1 |
| Example 10 | 25 | 120 | 1.5 | 1 | 2 | 140 | >200 | 97 | 0 | 65 | 3 |
| Example 11 | 24 | 130 | 1.5 | 1 | 2 | 140 | >200 | 96 | 0 | 64 | 4 |

TABLE 2

| | Porous membrane | | | | | | | | | | Porous layer | | |
|---|---|---|---|---|---|---|---|---|---|---|---|---|---|
| | Membrane thickness L μm | Porosity ϵ % | Air permeability sec/100 cc | Average pore size d μm | Tortuosity τa | Number B of pores pores/μm² | Puncture strength gf | Puncture strength in terms of 25 μm gf/25 μm | Membrane resistance R Ω·cm² | Withstand voltage kV | Tortuosity determined from membrane resistance τb | Inorganic filler | Binder | Layer thickness μm |
| Comparative Example 1 | 26 | 65 | 75 | 0.060 | 1.18 | 195 | 358 | 339 | 1.5 | 1.8 | 1.18 | Aluminum hydroxide oxide | LTX | 7 |
| Comparative Example 2 | 30 | 57 | 172 | 0.050 | 1.43 | 203 | 501 | 415 | 1.9 | 2.0 | 1.16 | Aluminum hydroxide oxide | LTX | 7 |
| Comparative Example 3 | 16 | 47 | 163 | 0.058 | 1.86 | 91 | 342 | 525 | 1.5 | 1.4 | 1.28 | Calcined kaolin | LTX | 7 |
| Comparative Example 4 | 16 | 41 | 157 | 0.085 | 2.10 | 36 | 366 | 572 | 2.1 | 1.4 | 1.41 | Calcined kaolin | LTX | 6 |
| Comparative Example 5 | 20 | 41 | 283 | 0.069 | 2.29 | 50 | 620 | 760 | 3.2 | 1.8 | 1.58 | Calcined kaolin | LTX | 7 |
| Comparative Example 6 | 17 | 60 | 84 | 0.057 | 1.45 | 165 | 385 | 566 | 1.0 | 1.3 | 1.15 | — | — | — |
| Comparative Example 7 | 18 | 64 | 78 | 0.055 | 1.38 | 191 | 399 | 542 | 0.9 | 1.4 | 1.08 | — | — | — |
| Comparative Example 8 | 15 | 60 | 90 | 0.056 | 1.54 | 157 | 367 | 600 | 0.9 | 1.3 | 1.15 | — | — | — |
| Comparative Example 9 | 13 | 64 | 65 | 0.050 | 1.41 | 222 | 331 | 618 | 0.7 | 1.2 | 1.11 | — | — | — |
| Comparative Example 10 | 17 | 57 | 132 | 0.052 | 1.64 | 163 | 525 | 788 | 1.1 | 1.4 | 1.19 | — | — | — |
| Comparative Example 11 | 12 | 65 | 61 | 0.043 | 1.36 | 325 | 328 | 678 | 0.7 | 0.9 | 1.18 | — | — | — |
| Comparative Example 12 | 11 | 67 | 40 | 0.056 | 1.25 | 223 | 300 | 658 | 0.6 | 0.9 | 1.14 | — | — | — |
| Comparative Example 13 | 26 | 65 | 75 | 0.060 | 1.18 | 195 | 358 | 339 | 1.5 | 1.8 | 1.18 | — | — | — |
| Comparative Example 14 | 30 | 57 | 172 | 0.050 | 1.43 | 203 | 501 | 415 | 1.9 | 2.0 | 1.16 | — | — | — |
| Comparative Example 15 | 16 | 47 | 163 | 0.058 | 1.86 | 91 | 342 | 525 | 1.5 | 1.4 | 1.28 | — | — | — |
| Comparative Example 16 | 16 | 41 | 157 | 0.085 | 2.10 | 36 | 366 | 572 | 2.1 | 1.4 | 1.41 | — | — | — |
| Comparative Example 17 | 20 | 41 | 283 | 0.069 | 2.29 | 50 | 619 | 759 | 3.2 | 1.8 | 1.58 | — | — | — |
| Comparative Example 18 | 18 | 57 | 116 | 0.057 | 1.61 | 138 | 364 | 506 | 1 | 1.3 | 1.15 | — | — | — |

| | Multilayer porous membrane | | | | | | | | |
|---|---|---|---|---|---|---|---|---|---|
| | Total thickness μm | Air permeability sec/100 cc | Withstand voltage kV | Thermal shrinkage rate at 150° C. MD % | Thermal shrinkage rate at 150° C. TD % | Shutdown temperature ° C. | Short-circuit temperature ° C. | 2C rate capability % | 2C rate reduction rate % | 10C rate capability % | 10C rate reduction rate % |
| Comparative Example 1 | 33 | 86 | 1.9 | 28 | 25 | 144 | 165 | 95 | 0 | 48 | 13 |

TABLE 2-continued

| | | | | | | | | | | | |
|---|---|---|---|---|---|---|---|---|---|---|---|
| Comparative Example 2 | 37 | 183 | 2.0 | 30 | 27 | 144 | 162 | 95 | 0 | 44 | 12 |
| Comparative Example 3 | 23 | 169 | 1.4 | 1 | 1 | 145 | >200 | 96 | 0 | 50 | 12 |
| Comparative Example 4 | 22 | 163 | 1.4 | 1 | 1 | 148 | >200 | 95 | 0 | 41 | 15 |
| Comparative Example 5 | 27 | 312 | 1.8 | 2 | 1 | 148 | >200 | 94 | 1 | 34 | 21 |
| Comparative Example 6 | 17 | 84 | 1.3 | 57 | 67 | 145 | 154 | 96 | — | 69 | — |
| Comparative Example 7 | 18 | 78 | 1.4 | 54 | 64 | 145 | 154 | 96 | — | 72 | — |
| Comparative Example 8 | 15 | 90 | 1.3 | 54 | 59 | 145 | 154 | 96 | — | 74 | — |
| Comparative Example 9 | 13 | 65 | 1.2 | 60 | 67 | 145 | 154 | 96 | — | 75 | — |
| Comparative Example 10 | 17 | 132 | 1.4 | 66 | 73 | 145 | 154 | 95 | — | 65 | — |
| Comparative Example 11 | 12 | 61 | 0.9 | 45 | 71 | 145 | 154 | 96 | — | 75 | — |
| Comparative Example 12 | 11 | 40 | 0.9 | 68 | 74 | 145 | 154 | 97 | — | 77 | — |
| Comparative Example 13 | 26 | 75 | 1.8 | 67 | 65 | 144 | 153 | 95 | — | 55 | — |
| Comparative Example 14 | 30 | 172 | 2.0 | 72 | 68 | 144 | 154 | 95 | — | 50 | — |
| Comparative Example 15 | 16 | 163 | 1.4 | 73 | 53 | 145 | 155 | 96 | — | 57 | — |
| Comparative Example 16 | 16 | 157 | 1.4 | 60 | 50 | 148 | 152 | 95 | — | 48 | — |
| Comparative Example 17 | 20 | 283 | 1.8 | 63 | 47 | 148 | 154 | 95 | — | 43 | — |
| Comparative Example 18 | 18 | 116 | 1.5 | 55 | 66 | 140 | 154 | 96 | — | 69 | — |

*LTX . . . Arylic latex

Comparative Examples 6 to 12 and 18 use the porous membranes having an average pore size d=0.035 to 0.060 µm, a tortuosity $\tau_a$=1.1 to 1.7, and the number B of pores=100 to 500 pores/µm², which are determined by the gas-liquid method, and having a membrane thickness of not more than 22 µm. The porous membranes in these Comparative Examples exhibit a very small membrane resistance (less than 1.2 Ω·cm²) and a very high value of the rate capability at 10 C discharge (not less than 65%). Compared to the membrane resistances and the rate capability of the porous membranes in Comparative Examples 13 and 14 in which the membrane thickness is more than 22 µm and those in Comparative Example 15 to 17 in which $\tau_a$>1.8 and B<100, it is clear that the porous membranes in Comparative Examples 6 to 12 and 18 have very high ion conductivity. The porous membranes in Comparative Examples 6 to 12 and 18 exhibit a high value of the withstand voltage (not less than 0.9 kV). It is considered that a large number of very small pores gather to form a fine communication pore to attain a pore structure in which ion conductivity is high while air discharge in the membrane thickness direction barely occurs. The porous membranes in Comparative Examples 6 to 14 and 18 have a tortuosity determined from the membrane resistance (τb) of less than 1.2. On the other hand, the thermal shrinkage rate in TD substantially exceeds 30% and the short-circuit temperature is approximately 154° C. in the porous membranes in Comparative Examples 6, and the heat resistance thereof is found to be insufficient.

In Examples 1 to 11, the multilayer porous membranes are prepared by forming a porous layer containing an inorganic filler and a resin binder on the porous membranes in Comparative Examples 6 to 12 and 18, respectively. Formation of the porous layer reduces the thermal shrinkage rate to a very small value (not more than 2% even at 150° C.), and improves the short-circuit temperature (more than 200° C.) and significantly improves the heat resistance properties. In addition, the withstand voltage is improved (not less than 1.0 kV). The rate capability at 10 C discharge is not less than 60% and the rate reduction rates are small (less than 10%). It concludes that the multilayer porous membranes maintain high ionic permeability of the base material, that is, the porous membranes in Comparative Examples 6 to 12 and 18.

In Comparative Examples 1 and 2, the multilayer porous membranes are prepared by forming a porous layer containing an inorganic filler and a resin binder on the porous membranes in Comparative Examples 13 and 14, respectively. Formation of the porous layer improves the heat resistance properties; however, the value of the heat resistance properties is large (not less than 10%). The short-circuit temperature is also improved, but up to approximately 165° C. In addition, the rate capability at 10 C discharge is not more than 50%. It is clear that this value is 10% or more reduced compared to those of the multilayer porous membranes in Examples 1 to 7. Even if the porous membrane, like the porous membranes in Comparative Examples 1 and 2 as the base material, has a pore structure that satisfies an average pore size d=0.035 to 0.060 µm, a tortuosity $\tau_a$=1.1 to 1.7, and the number B of pores=100 to 500 pores/µm², which are determined by the gas-liquid method, if it has a large membrane thickness, it is clear that ion conductivity reduces and the degree of an improvement in the heat resistance due to disposition of the porous layer is small.

In Comparative Examples 3 to 5, the multilayer porous membranes are prepared by forming a porous layer containing an inorganic filler and a resin binder on the porous membranes in Comparative Examples 15 to 17, respectively. Formation of the porous layer significantly improves the heat resistance properties. The 2 C rate capability is approximately 95%, equivalent to those in Example 1 to 11. In contrast, the rate capability at 10 C discharge is not more than 50%, which is 10% or more reduced compared to those of the multilayer porous membrane in Examples 1 to 11. The 10 C rate reduction rates are not less than 10% in Comparative Examples 3 to 5, indicating that output during high output is significantly reduced.

Examples 12 to 15 below correspond to the examples in Embodiment 2.

The physical properties in Examples were determined by the following methods, and other physical properties were determined by the same methods as those in Examples above.

(15) Shrinkage Stress at 85° C.

The shrinkage stress at 85° C. was measured with a TMA50 (trademark) made by SHIMADZU Corporation. When the value in MD (TD) was measured, a cut sample having a width of 3 mm in TD (MD) was prepared. The sample was fixed to chucks such that the distance between chucks was 10 mm, and was set in the dedicated probe. The sample was then heated from 30° C. to 200° C. at an initial load of 1.0 g and a temperature raising rate of 10° C./min. The load (gf) generated during heating was measured. The load (gf) at 85° C. was read, and the value was defined as the shrinkage stress at 85° C.

(16) Thermal Shrinkage Rate (%) at 100° C. and 150° C.

A separator was cut to prepare samples of 100 mm in MD and 100 mm in TD. The samples were left in an oven at 100° C. and an oven at 150° C. for one hour, respectively. At this time, each of the samples was sandwiched between two papers to prevent hot air from directly contacting the sample. After the samples were taken out from the ovens and cooled, the lengths (mm) were measured. The MD and TD thermal shrinkage rates were calculated from the following equations, respectively:

MD thermal shrinkage rate (%)=(100−length in MD after heating)/100×100

TD thermal shrinkage rate (%)=(100−length in TD after heating)/100×100

(17) Rate Capability of Porous Membrane and Multilayer Porous Membrane a. Production of Positive Electrode 91.2 Parts by mass of lithium nickel manganese cobalt complex oxide ($Li[Ni_{1/3}Mn_{1/3}Co_{1/3}]O_2$) as a positive electrode active substance, 2.3 parts by mass of flake graphite and 2.3 parts by mass of acetylene black as electric conductive materials, and 4.2 parts by mass of polyvinylidene fluoride (PVDF) as a resin binder were provided. These were dispersed in N-methyl pyrrolidone (NMP) to prepare a slurry. The slurry was applied onto one surface of an aluminum foil having a thickness of 20 μm and serving as a positive electrode collector with a die coater such that the amount of the positive electrode active substance applied was 120 g/m². The coating was dried at 130° C. for 3 minutes. The product was then compression-formed with a roll press such that the bulk density of the positive electrode active substance was 2.90 g/cm³. Thus, a positive electrode was prepared. The positive electrode was punched into a circle having an area of 2.00 cm².

b. Production of Negative Electrode 96.6 Parts by mass of artificial graphite as a negative electrode active substance, and 1.4 parts by mass of ammonium salt of carboxymethyl cellulose and 1.7 parts by mass of a styrene-butadiene copolymer latex as resin binders were provided. These were dispersed in purified water to prepare a slurry. The slurry was applied onto one surface of a copper foil having a thickness of 16 μm and serving a negative electrode collector with a die coater such that the amount of the negative electrode active substance applied was 53 g/m². The coating was dried at 120° C. for 3 minutes. The product was then compression-formed with a roll press such that the bulk density of the negative electrode active substance was 1.35 g/cm³. Thus, a negative electrode was prepared. The negative electrode was punched into a circle having an area of 2.05 cm².

c. Nonaqueous Electrolytic Solution

A solute $LiPF_6$ was dissolved at a concentration of 1.0 ml/L in a mixed solvent of ethylene carbonate:ethyl methyl carbonate=1:2 (volume ratio) to prepare a nonaqueous electrolytic solution.

d. Assembly of Battery

The negative electrode, the multilayer porous membrane, and the positive electrode were laminated in this order such that the active substance-containing surface of the positive electrode faced that of the negative electrode. The laminated body was placed in a stainless steel metal container with a cover such that the copper foil of the negative electrode and the aluminum foil of the positive electrode contact the main body of the container and the cover, respectively. The main body of the container is insulated from the cover of the container. A cell was prepared. The cell was dried under reduced pressure at 70° C. for 10 hours. Subsequently, the nonaqueous electrolytic solution was injected into the container within an argon box, and the container was sealed to prepare a battery for evaluation.

e. Evaluation of Rate Capability

The rate capability of the separators was evaluated by preparing 10 batteries for each separator by the same method as above.

The battery assembled in d. was charged to a cell voltage of 4.2 V at 25° C. and a current value of 3 mA (approximately 0.5 C). Reduction of the current value was started from 3 mA such that 4.2 V was maintained. In such a manner, the initial charge after preparation of the battery was performed for approximately 6 hours in total. Subsequently, the battery was discharged at a current value of 3 mA to a cell voltage of 3.0 V.

Next, the battery was charged to a cell voltage of 4.2 V at 25° C. with a current value of 6 mA (approximately 1.0 C). Reduction of the current value was started from 6 mA such that 4.2 V was maintained. In such a manner, the battery was charged for approximately 3 hours in total. Subsequently, the battery was discharged at a current value of 6 mA to a cell voltage of 3.0 V. The discharge capacity at this time was defined as the 1 C discharge capacity (mAh).

Next, the battery was charged to a cell voltage of 4.2 V at 25° C. with a current value of 6 mA (approximately 1.0 C). Reduction of the current value was started from 6 mA such that 4.2 V was maintained. In such a manner, the battery was charged for approximately 3 hours in total. Subsequently, the battery was discharged at a current value of 60 mA (approximately 10 C) to a cell voltage of 3.0 V. The discharge capacity at this time was defined as the 10 C discharge capacity (mAh).

The proportion of the 10 C discharge capacity to the 1 C discharge capacity was calculated, and the value was defined as the rate capability.

10 C rate capability (%)=(10 C discharge capacity/1 C discharge capacity)×100

Using the 10 batteries prepared for each separator, the 10 C rate capability was measured. The uniformity of output properties was evaluated on the basis of the difference (R)

between the maximum value (max) and the minimum value (min) among the values of the 10 C rate capability obtained in the measurement.

Example 12

47.5 parts by mass of a homopolymer polyethylene having an Mv of 700,000, 47.5 parts by mass of a homopolymer polyethylene having an Mv of 250,000, and 5 parts by mass of a homopolymer polypropylene having an Mv of 400,000 were dry blended using a tumbler blender. 1 part by mass of pentaerythrityl-tetrakis-[3-(3,5-di-t-butyl-4-hydroxyphenyl) propionate] as an antioxidant was added to 99 parts by mass of the obtained polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity at 37.78° C.: $7.59 \times 10^{-5}$ m$^2$/s) was injected into a cylinder of the extruder by a plunger pump.

The feeder and the pump were adjusted such that the ratio of the amount of liquid paraffin to the mixture of all the components melt kneaded and extruded was 67% by mass (resin composition content: 33% by mass). For the melt kneading conditions, a preset temperature was 200° C., a screw rotation speed was 100 rpm, and an amount of discharge was 12 kg/h.

Then, the melt kneaded product was extruded through a T die and cast onto a cooling roll, whose surface temperature was controlled to be 25° C., to obtain a gel sheet having a thickness of 1600 μm.

Next, the gel sheet was guided to a simultaneous biaxial tenter stretching machine to be subjected to biaxial stretching. For the stretching condition settings, the MD magnification was 7.0 times, the TD magnification was 6.1 times, and a preset temperature was 121° C.

Next, the sheet was guided to a tank of methyl ethyl ketone, and was sufficiently immersed in methyl ethyl ketone to remove liquid paraffin by extraction. Subsequently methyl ethyl ketone was removed by drying.

Next, the sheet was guided to a TD tenter, and subjected to heat setting. The heat setting temperature was 120° C., the largest TD magnification was 2.0 times, and the relaxation rate was 0.90. Then, the sheet was relaxed in MD with a speed-variable heating roll. At this time, the relaxation rate was 0.95. As a result, a polyolefin resin porous membrane having: a membrane thickness of 17 μm; a porosity of 60%; an air permeability of 88 seconds/100 cc; an average pore size d=0.057 μm, a tortuosity τa=1.45, and the number B of pores=165 pores/μm$^2$, which were determined by the gas-liquid method; and a puncture strength of 567 gf in terms of 25 μm, was obtained.

Next, 95.0 parts by mass of calcined kaolin prepared by calcining wet kaolinite (kaolinite ($Al_2Si_2O_5(OH)_4$) as a main component) at a high temperature (average particle size: 1.8 μm), 5.0 parts by mass of an acrylic latex (solid content: 40%, average particle size: 220 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a gravure coater. Water was removed by drying at 60° C. to obtain a multilayer porous membrane including the polyolefin resin porous membrane and a porous layer having a thickness of 7 μm and formed on the polyolefin resin porous membrane.

Example 13

A polyolefin resin porous membrane having: a membrane thickness of 13 μm; a porosity of 64%; an air permeability of 67 seconds/100 cc; an average pore size d=0.050 μm, a tortuosity τa=1.41, and the number B of pores=222 pores/μm$^2$, which were determined by the gas-liquid method; and a puncture strength of 618 gf in terms of 25 μm, was obtained in the same manner as that in Example 12 except that the melt kneaded product was cast through the T die to prepare a gel sheet having a thickness of 1150 μm, a preset temperature for biaxial stretching with the simultaneous biaxial tenter stretching machine was 120° C., and the relaxation rate in MD was 0.92.

Next, 96.0 Parts by mass of aluminum hydroxide oxide (average particle size: 1.0 μm), 4.0 parts by mass of an acrylic latex (solid content: 40%, average particle size: 140 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane with a gravure coater. Water was removed by drying at 60° C. to obtain a multilayer porous membrane including a polyolefin resin porous membrane and a porous layer having a thickness of 7 μm and formed on the polyolefin resin porous membrane.

Example 14

A multilayer porous membrane was obtained by the same method as that in Example 13 except that the porous layer containing aluminum hydroxide oxide and formed on the polyolefin resin porous membrane had a thickness of 4 μm.

Comparative Example 19

A multilayer porous membrane was obtained by the same method as that in Example 12 except that thermal relaxation in MD was not performed.

Comparative Example 20

A multilayer porous membrane was obtained by the same method as that in Example 12 except that the heat setting temperature in the TD tenter was 132° C., and thermal relaxation in MD was not performed.

Comparative Example 21

A multilayer porous membrane was obtained by the same method as that in Example 13 except that thermal relaxation in MD was not performed, and the porous layer containing aluminum hydroxide oxide had a thickness of 2 μm.

Comparative Example 22

47.5 parts by mass of a homopolymer polyethylene having an My of 700,000, 47.5 parts by mass of a homopolymer polyethylene having an Mv of 250,000, and 5 parts by mass of a homopolymer polypropylene having an Mv of 400,000 were dry blended using a tumbler blender. 1 part by mass of pentaerythrityl-tetrakis-[3-(3,5-di-t-butyl-4-hydroxyphenyl) propionate] as an antioxidant was added to 99 parts by mass of the obtained polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of $7.59 \times 10^{-5}$ m$^2$/s at 37.78° C.) as a plasticizer was injected into a cylinder of the extruder by a plunger pump. The feeder and the pump were adjusted such that the ratio of the amount of the liquid paraffin to the mixture of all the components melt kneaded and extruded was 65% by mass. For the melt kneading conditions, a preset temperature was 200° C., a screw rotation speed was 240 rpm, and an amount of discharge was 12 kg/h.

Then, the melt kneaded product was extruded through a T die and cast onto a cooling roll, whose surface temperature was controlled to be 25° C., to obtain a sheet-like polyolefin composition having a thickness of 1300 μm.

Next, the polyolefin composition was guided to a simultaneous biaxial tenter stretching machine, and subjected to simultaneous biaxial stretching of 7 times in the MD and 6.4 times in the TD. At this time, the preset temperature of the simultaneous biaxial tenter was 118° C. Next, the stretched polyolefin composition was guided to a methyl ethyl ketone tank, and the liquid paraffin was removed by extraction. Subsequently, methyl ethyl ketone was removed by drying.

Next, the polyolefin composition was guided to a TD tenter, and subjected to heat setting. The heat setting temperature was 122° C., the largest TD magnification was 1.4 times, and the relaxation rate was 0.85. As a result, a polyolefin resin porous membrane having: a membrane thickness of 16 μm; a porosity of 47%; an air permeability of 163 seconds/100 cc; an average pore size d=0.058 μm, a tortuosity τa=1.86, and the number of pores B=91 pores/μm$^2$, which were determined by the gas-liquid method; and a puncture strength of 525 gf in terms of 25 μm, was obtained.

Next, 95.0 parts by mass of calcined kaolin prepared by calcining wet kaolin (kaolinite ($Al_2Si_2O_5(OH)_4$) as a main component) at a high temperature (average particle size: 1.8 μm), 5.0 parts by mass of an acrylic latex (solid content: 40%, average particle size: 220 nm, lowest membrane forming temperature: 0° C. or less), and 0.5 parts by mass of an aqueous solution of ammonium polycarboxylate (SN-DISPERSANT 5468 made by SAN NOPCO Limited) were uniformly dispersed in 180 parts by mass of water to prepare a coating solution. The coating solution was applied to the surface of the polyolefin resin porous membrane using a micro gravure coater. Water was removed by drying at 60° C. to obtain a multilayer porous membrane including the polyolefin resin porous membrane and a porous layer having a thickness of 7 μm and formed on the polyolefin resin porous membrane.

Example 15

A porous membrane was obtained in the same manner as that in Example 12 except that no inorganic filler porous layer was formed.

Comparative Example 23

A porous membrane was obtained in the same manner as that in Comparative Example 19 except that no inorganic filler porous layer was formed.

The physical properties and the results of evaluation of the porous membranes, the porous layers, and the multilayer porous membranes obtained in Examples and Comparative Examples are shown in Table 3 below.

TABLE 3

|  |  | Unit | Example 12 | Example 13 | Example 14 | Comparative Example 19 | Comparative Example 20 |
|---|---|---|---|---|---|---|---|
| Porous membrane | Membrane thickness | μm | 17 | 13 | 13 | 17 | 12 |
|  | Porosity | % | 60 | 64 | 64 | 60 | 41 |
|  | Air permeability | sec./100 cc | 88 | 67 | 67 | 84 | 92 |
|  | Shrinkage stress at 85° C. | gf | 1.8 | 1.6 | 1.6 | 2.3 | 1.7 |
|  | Average pore size | μm | 0.057 | 0.050 | 0.050 | 0.057 | 0.085 |
|  | Tortuosity | — | 1.45 | 1.41 | 1.41 | 1.45 | 2.1 |
|  | Number of pores | pores/μm$^2$ | 165 | 222 | 222 | 165 | 36 |
|  | Puncture strength | gf | 385 | 331 | 331 | 385 | 288 |
| Porous layer | Inorganic filler | — | Calcined kaolin | Aluminum hydroxide oxide | Aluminum hydroxide oxide | Calcined kaolin | Calcined kaolin |
|  | Binder | — | Acrylic latex | Acrylic latex | Acrylic latex | Acrylic latex | Acrylic latex |
|  | Layer thickness | μm | 7 | 7 | 4 | 7 | 7 |
| Multilayer porous membrane | Total thickness | μm | 24 | 20 | 17 | 24 | 19 |
|  | Air permeability | sec./100 cc | 92 | 77 | 75 | 88 | 96 |
|  | Thermal shrinkage (100° C.) | MD % | <1 | <1 | <1 | <1 | <1 |
|  |  | TD % | <1 | <1 | <1 | <1 | <1 |
|  | Thermal shrinkage (150° C.) | MD % | 1 | 1 | 2 | 1 | 1 |
|  |  | TD % | 1 | 1 | 2 | 1 | 1 |
|  | Rate capability | ave. % | 67 | 70 | 70 | 67 | 51 |
|  |  | max. % | 70.4 | 72.3 | 73.2 | 70.6 | 53.4 |
|  |  | min. % | 65.7 | 68.8 | 66.8 | 60.5 | 48.5 |
|  |  | R % | 4.7 | 3.5 | 6.4 | 10.1 | 4.9 |

|  |  | Unit | Comparative Example 21 | Comparative Example 22 | Example 15 | Comparative Example 23 |
|---|---|---|---|---|---|---|
| Porous membrane | Membrane thickness | μm | 13 | 16 | 17 | 17 |
|  | Porosity | % | 64 | 47 | 60 | 60 |

TABLE 3-continued

|  |  |  | | | | | |
|---|---|---|---|---|---|---|---|
| | | Air permeability | sec./100 cc | 65 | 163 | 88 | 84 |
| | | Shrinkage stress at 85° C. | gf | 2.5 | 3.2 | 1.8 | 2.3 |
| | | Average pore size | μm | 0.050 | 0.058 | 0.057 | 0.057 |
| | | Tortuosity | — | 1.41 | 1.86 | 1.45 | 1.45 |
| | | Number of pores | pores/μm² | 222 | 91 | 165 | 165 |
| | | Puncture strength | gf | 331 | 342 | 385 | 385 |
| Porous layer | Inorganic filler | | — | Aluminum hydroxide oxide | Calcined kaolin | — | — |
| | Binder | | — | Acrylic latex | Acrylic latex | — | — |
| | Layer thickness | | μm | 2 | 7 | — | — |
| Multilayer porous membrane | Total thickness | | μm | 15 | 23 | 17 | 17 |
| | Air permeability | | sec./100 cc | 76 | 169 | 88 | 84 |
| | Thermal shrinkage (100° C.) | MD | % | 6 | <1 | 8 | 11 |
| | | TD | % | 4 | 0 | 6 | 8 |
| | Thermal shrinkage (150° C.) | MD | % | 48 | 1 | 54 | 55 |
| | | TD | % | 52 | 1 | 67 | 68 |
| | Rate capability | ave. | % | 68 | 50 | 65 | 66 |
| | | max. | % | 72.1 | 53.8 | 69.9 | 70.1 |
| | | min. | % | 61.6 | 42.8 | 60.2 | 57.2 |
| | | R | % | 10.5 | 11 | 9.7 | 12.9 |

Examples 12 to 14 and Comparative Examples 19 and 21 exhibit a very high value of the rate capability at 10 C discharge (not less than 65%). Comparative Examples 19 and 21, however, have a fluctuation (max–min) of approximately 10% of the rate capability at 10 C discharge. In contrast, Examples 12 to 14 have a small fluctuation (max–min), which is 3.5 to 6.4%. This is probably because the shrinkage stress at 85° C. is adjusted to fall within the small range (not more than 2.2 gf).

From comparison between Example 15 and Comparative Example 23, Example 15 has a small fluctuation (max–min) in the rate capability. This is probably because the shrinkage stress at 85° C. is adjusted to fall within the small range (not more than 2.2 gf).

Comparison of Examples 13 and 14 to Comparative Examples 22 and Example 15 indicates that the porous layers in Examples 13 and 14 have a layer thickness of not less than 3 μm and exhibit not only excellent thermal shrinkage property but also high rate capability.

Comparative Example 21 exhibits inferior rate capability due to its low porosity.

Examples 16 to 24 below correspond to the examples of Embodiment 3.

The physical properties in Examples were determined by the following methods, and other physical properties were determined by the same method as that in Examples above.

(18) Shutdown Rate

Two nickel foils (A and B) having a thickness of 10 μm were prepared. With a Teflon tape, Nickel foil A was fixed on a glass plate and masked such that a 10 mm square portion of the foil was left.

Another Nickel foil B was disposed on a ceramic plate connected to a thermocouple. A measurement sample of a microporous membrane immersed in a prescribed electrolytic solution for 3 hours was disposed on Nickel foil B. The glass plate having Nickel foil A attached was disposed on the sample, and silicon rubber was further disposed thereon.

The laminate was set on a hot plate, and the temperature was then raised at a rate of 2° C./min or 18° C./min while a pressure of 1.5 MPa was applied with a hydraulic press.

At this time, changes in impedance were measured at an alternating current of 1 V and 1 kHz. In the measurement, the temperature when the impedance reached 1000Ω was defined as a fuse temperature. The temperature when pores were clogged and then the impedance reached less than 1000Ω again was defined as the short-circuit temperature. The time needed to increase the impedance from 100Ω to 1000Ω during an increase in the temperature was defined as a shutdown rate (R).

$$R \text{ (seconds)} = (t(1000) - t(100))/V(t) \times 60$$

$t(100)$: temperature when the impedance reaches 100 Ω
$t(1000)$: temperature when the impedance reaches 1000 Ω
$V(t)$: temperature raising rate (2° C./min or 18° C./min)

The prescribed electrolytic solution has the following composition ratio.

composition ratio of solvents (volume ratio): propylene carbonate/ethylene carbonate/γ-butyllactone=1/1/2 composition ratio of the electrolytic solution: $LiBF_4$ is dissolved at a concentration of 1 mol/L in the solvent above, and trioctyl phosphate was further added such that the concentration is 0.5% by weight.

(19) Nail Penetration Evaluation

<Production of Positive Electrode>

A mixed positive electrode active substance: 85 parts by mass (prepared by mechanically mixing lithium nickel manganese cobalt complex oxide powder ($LiNi_{1/3}Mn_{1/3}Co_{1/3}O_2$) with lithium manganese complex oxide powder ($LiMn_2O_4$) as positive electrode active substances in a mass ratio of 70:30), acetylene black as a conductive aid: 6 parts by mass, and PVDF as a binder: 9 parts by mass were uniformly mixed in N-methyl-2-pyrrolidone (NMP) as a solvent to prepare a paste containing a positive electrode mixture. The paste containing the positive electrode mixture was uniformly applied onto both surfaces of a collector composed of an aluminum foil and having a thickness of 20 μm, and was dried. The product was then compression-formed with a roll press to adjust the thickness of the layer of the positive electrode mixture such that the product had a total thickness of 130 μm. A positive electrode of a rectangular sheet (short side: 95 mm, long side: 120 mm) having a lead tab terminal disposed on the upper short side thereof was prepared, wherein the lead tab terminal was composed of an aluminum foil having a length of 20 mm and applied no active substance.

<Production of Negative Electrode>

Graphite as a negative electrode active substance: 91 parts by mass and PVDF as a binder: 9 parts by mass were uniformly mixed in NMP as a solvent to prepare a paste containing a negative electrode mixture. The paste containing a negative electrode mixture was uniformly applied onto both surfaces of a collector composed of a copper foil and having a thickness of 15 μm, and was dried. The product was then compression-formed with a roll press to adjust the thickness of the layer of the negative electrode mixture such that the product had a total thickness of 130 μm. A negative electrode of a rectangular sheet (short side: 95 mm, long side: 120 mm) having a lead tab terminal disposed on the upper short side thereof was prepared, wherein the lead tab terminal was composed of a copper foil having a length of 20 mm and applied no active substance.

<Preparation of Nonaqueous Electrolytic Solution>

A solute $LiPF_6$ was dissolved at a concentration of 1.0 mol/L in a mixed solvent of ethylene carbonate:ethyl methyl carbonate:dimethyl carbonate=1:1:1 (volume ratio) to prepare a nonaqueous electrolytic solution.

<Production of Cell>

Figure 5:
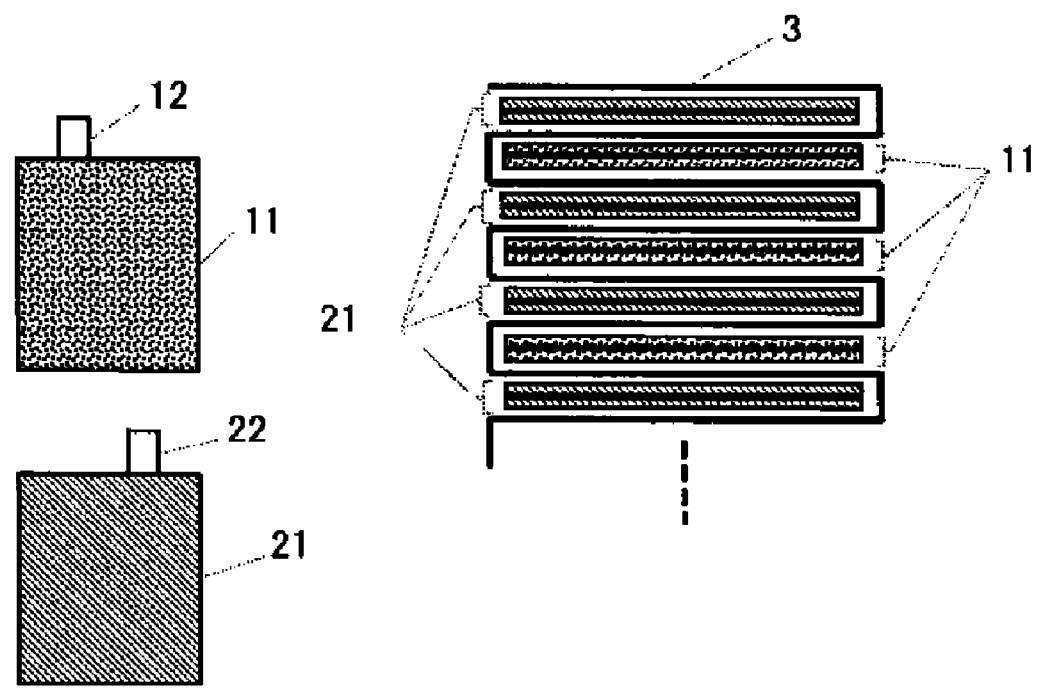
FIG. 5 is a schematic view showing a laminated body of electrode plates.

27 positive electrode sheets above and 28 negative electrode sheets above were alternatingly laminated while a separator was interposed between the positive electrode sheet and the negative electrode sheet to separate the positive electrode sheet from the negative electrode sheet. Thus, a laminate body of electrode plates was prepared. The separator was a strip-like separator having a width of 125 mm, and was folded in a zigzag pattern (99 times folded) to prepare the laminate body of electrode plates. A schematic view of the laminate body of electrode plates is shown in FIG. 5.

The laminate body of electrode plates was pressed into a flat plate. The flat plate was then accommodated in an aluminum laminate film, and three sides of the film were heat sealed. The lead tab terminal of the positive electrode and that of the negative electrode were projected from one side of the laminate film. After drying, the nonaqueous electrolytic solution was injected into the container, and the unsealed side was sealed. The lithium ions battery thus prepared was designed to have a capacity of 10 Ah.

<Nail Penetration Evaluation>

The laminate cell was constant-current constant-voltage (CCCV) charged for 3 hours at a current value of 3 A (0.3 C) and a final cell voltage of 4.2 V. The laminate cell was settled on an iron plate within an explosion-proof booth. An iron nail having a diameter of 2.5 mm was penetrated through the center of the cell under an environment around 25° C. at a rate of 3 mm/second. The nail was penetrated through the cell and maintained. The cell was determined as unacceptable (x) if the cell ignited or exploded in 15 minutes, and as acceptable (○) if the cell did not ignite or explode in 15 minutes.

Example 16

47.5 Parts by mass of homopolymer polyethylene having an Mv of 700000, 47.5 parts by mass of homopolymer polyethylene having an Mv of 250000, and 5 parts by mass of homopolymer polypropylene having an Mv of 400000 were dry blended with a tumbler blender. As an antioxidant, 1 wt % pentaerythrityl-tetrakis-[3-(3,5-di-t-butyl-4-hydroxyphenyl)propionate] was added to 99 wt % pure polymer, and was dry blended with a tumbler blender again to prepare a mixture of the polymers and the like. After replacement by nitrogen, the obtained mixture of the polymers and the like was fed to a twin screw extruder under a nitrogen atmosphere with a feeder. Liquid paraffin (kinematic viscosity at 37.78° C.: $7.59 \times 10^{-5}$ $m^2/s$) was injected into an extruder cylinder with a plunger pump.

The feeder and the pump were adjusted such that the ratio of the amount of liquid paraffin to the mixture of all the components melt kneaded and extruded was 66 wt % (resin composition content: 34%). For the melt kneading conditions, a preset temperature was 200° C., a screw rotation speed was 100 rpm, and an amount of discharge was 12 kg/h.

Then, the melt kneaded product was extruded through a T die and cast onto a cooling roll, whose surface temperature was controlled to be 25° C., to obtain a gel sheet having a thickness of 1570 μm.

Next, the gel sheet was guided to a simultaneous biaxial tenter stretching machine to be subjected to biaxial stretching. For the stretching condition settings, the MD magnification was 7.0 times, the TD magnification was 6.1 times, and a preset temperature was 119° C.

Next, the sheet was guided to a tank of methyl ethyl ketone, and was sufficiently immersed in methyl ethyl ketone to remove liquid paraffin by extraction. Subsequently methyl ethyl ketone was removed by drying.

Next, the sheet was guided to a TD tenter, and subjected to heat setting. The heat setting temperature was 127° C., the largest TD magnification was 2.0 times, and the relaxation rate was 0.9. The physical properties of the polyolefin resin porous membrane obtained are shown in Table 4.

Next, 92.0 Parts by mass of aluminum hydroxide oxide (average particle size: 1.0 μm), 8.0 parts by mass of an acrylic latex suspension (solid content: 40%, average particle size: 150 nm), and 1.0 part by mass of an aqueous solution of ammonium polycarboxylate (SN-DISPERSANT 5468 made by SAN NOPCO Limited) were uniformly dispersed in 100 parts by mass of water to prepare a coating solution. The coating solution was applied onto the surface of the polyolefin resin porous membrane with a micro gravure coater. Water was removed by drying at 60° C. to obtain a multilayer porous membrane including a polyolefin resin porous membrane and a porous layer having a thickness of 7 μm and formed on the polyolefin resin porous membrane. The physical properties of the multilayer porous layer obtained are shown in Table 4.

Example 17

A coating layer was formed with calcined kaolin prepared by calcining wet kaolin(kaolinite ($Al_2Si_2O_5(OH)_4$) as a main component) at a high temperature, average particle size: 1.8 μm) instead of aluminum hydroxide oxide on the surface of the polyolefin resin porous membrane obtained in Example 16. 90.0 Parts by mass of calcined kaolin, 10.0 parts by mass of an acrylic latex suspension (solid content: 40%, average particle size: 150 nm), and 0.5 parts by weight of an aqueous solution of ammonium polycarboxylate (SN-DISPERSANT 5468 made by SAN NOPCO Limited) were uniformly dispersed in 180 parts by mass of water to prepare a coating solution. The coating solution was applied onto the surface of the polyolefin resin porous membrane prepared in Example 14 with a gravure coater. Water was removed by drying at 60° C. to obtain a multilayer porous membrane including a polyolefin resin porous membrane and a porous layer formed on the polyolefin resin porous membrane and having a thickness of 7 μm. The physical properties of the polyolefin resin porous membrane and the multilayer porous layer obtained are shown in Table 4.

Example 18

A multilayer porous membrane was obtained in the same manner as that in Example 16 except that the heat setting temperature was 121° C. The physical properties of the polyolefin resin porous membrane and the multilayer porous layer obtained are shown in Table 4.

Example 19

A multilayer porous membrane was obtained in the same manner as that in Example 18 except that the binder was replaced with an acrylic latex suspension (solid content: 40%, average particle size: 60 nm) having an average particle size of 60 nm. The physical properties of the polyolefin resin porous membrane and the multilayer porous layer obtained are shown in Table 4.

Example 20

A multilayer porous membrane was obtained in the same manner as that in Example 18 except that the binder was replaced with an acrylic latex suspension (solid content: 40%, average particle size: 460 nm) having an average particle size of 460 nm. The physical properties of the polyolefin resin porous membrane and the multilayer porous layer obtained are shown in Table 4.

Example 21

A multilayer porous membrane was obtained in the same manner as that in Example 16 except that heat setting with the TD tenter was not performed. The physical properties of the polyolefin resin porous membrane and the multilayer porous layer obtained are shown in Table 4.

Example 22

95 Parts by mass of homopolymer polyethylene having an Mv of 250000, and 5 parts by mass of homopolymer polypropylene having an Mv of 400000 were dry blended with a tumbler blender. As an antioxidant, 1 wt % pentaerythrityl-tetrakis-[3-(3,5-di-t-butyl-4-hydroxyphenyl) propionate] was added to 99 wt % pure polymer, and was dry blended with a tumbler blender again to prepare a mixture of the polymers and the like. After replacement by nitrogen, the obtained mixture of the polymers and the like was fed to a twin screw extruder under a nitrogen atmosphere with a feeder. Liquid paraffin (kinematic viscosity at 37.78° C.: $7.59 \times 10^{-5}$ m²/s) was injected into an extruder cylinder with a plunger pump.

The feeder and the pump were adjusted such that the ratio of the amount of liquid paraffin to the mixture of all the components melt kneaded and extruded was 62 wt % (PC content: 38%). For the melt kneading conditions, a preset temperature was 200° C., a screw rotation speed was 100 rpm, and an amount of discharge was 12 kg/h.

Then, the melt kneaded product was extruded through a T die and cast onto a cooling roll, whose surface temperature was controlled to be 25° C., to obtain a gel sheet having a thickness of 1250 μm.

Next, the gel sheet was guided to a simultaneous biaxial tenter stretching machine to be subjected to biaxial stretching. For the stretching condition settings, the MD magnification was 7.0 times, the TD magnification was 5.2 times, and a preset temperature was 123° C.

Next, the sheet was guided to a tank of methyl ethyl ketone, and was sufficiently immersed in methyl ethyl ketone to remove liquid paraffin by extraction. Subsequently methyl ethyl ketone was removed by drying.

Next, the sheet was guided to a TD tenter, and subjected to heat setting. The heat setting temperature was 125° C., the largest TD magnification was 3.5 times, and the relaxation rate was 0.94. The physical properties of the polyolefin resin porous membrane obtained are shown in Table 4.

Next, 92.0 parts by mass of aluminum hydroxide oxide (average particle size: 1.0 μm), 8.0 parts by mass of an acrylic latex suspension (solid content: 40%, average particle size: 150 nm), and 1.0 part by mass of an aqueous solution of ammonium polycarboxylate (SN-DISPERSANT 5468 made by SAN NOPCO Limited) were uniformly dispersed in 100 parts by mass of water to prepare a coating solution. The coating solution was applied onto the surface of the polyolefin resin porous membrane with a micro gravure coater. Water was removed by drying at 60° C. to obtain a multilayer porous membrane including a polyolefin resin porous membrane and a porous layer having a thickness of 6 μm and disposed on the polyolefin resin porous membrane. The physical properties of the multilayer porous layer obtained are shown in Table 4.

Example 23

26 Parts by mass of homopolymer polyethylene having an Mv of 250000, 16 parts by mass of homopolymer polyethylene having an Mv of 2000000, 8 parts by mass of silica "DM10C" (trademark, made by Tokuyama Corporation, hydrophobized with dimethyldichlorosilane) having an average primary particle size of 15 nm, 10 parts by mass of liquid paraffin "Smoil P-350P" (trademark, made by MATSUMURA OIL RESEARCH CORP.) as a plasticizer, and 0.3 parts by mass of pentaerythrityl-tetrakis-[3-(3,5-di-t-butyl-4-hydroxyphenyl)propionate] as an antioxidant were added, and were premixed with a SUPERMIXER. The obtained premixture was fed with a feeder to a feed port of a biaxial unidirectional screw type extruder. The liquid paraffin was side fed to a twin screw extruder cylinder such that the ratio of the liquid paraffin was 65 parts by mass to the whole mixture (100 parts by mass) melt kneaded and extruded. For the melt kneading conditions, a preset temperature was 200° C., a screw rotation speed was 180 rpm, and an amount of discharge was 12 kg/h. Then, the melt kneaded product was extruded through a T die onto a cooling roll, whose surface temperature was controlled to be 25° C., thereby to obtain a sheet-like polyolefin composition having a thickness of 1100 μm. Next, the sheet was guided to a simultaneous biaxial tenter stretching machine, and was subjected to biaxial stretching. For the stretching condition settings, the MD magnification was 7.0 times, the TD magnification was 6.2 times, and a preset temperature was 122° C. Next, the sheet was guided to a tank of methylene chloride, and was sufficiently immersed in methylene chloride to remove liquid paraffin by extraction. Subsequently methylene chloride was dried. Next, the sheet was guided to a TD tenter, and subjected to heat setting. The heat setting temperature was 127° C., the largest TD magnification was 2.0 times, and the relaxation rate was 0.9. The physical properties of the polyolefin resin porous membrane obtained are shown in Table 4.

Next, 92.0 parts by mass of aluminum hydroxide oxide (average particle size: 1.0 μm), 8.0 parts by mass of an acrylic latex suspension (solid content: 40%, average particle size: 150 nm), and 1.0 part by mass of an aqueous solution of ammonium polycarboxylate (SN-DISPERSANT 5468 made by SAN NOPCO Limited) were uniformly dispersed in 100 parts by mass of water to prepare a coating solution. The coating solution was applied onto the surface of the polyolefin resin porous membrane with a micro gravure coater. Water was removed by drying at 60° C. to obtain a multilayer porous membrane including a polyolefin resin porous membrane and a porous layer having a thickness of 7 μm and formed on the polyolefin resin porous membrane. The physical properties of the multilayer porous layer obtained are shown in Table 4.

Example 24

A coating layer mainly containing aluminum hydroxide oxide was formed on both surfaces of the polyolefin resin porous membrane obtained in Example 18. 92.0 Parts by mass of aluminum hydroxide oxide (average particle size: 1.0 μm), 8.0 parts by mass of an acrylic latex suspension (solid content: 40%, average particle size: 150 nm), and 1.0 part by weight of an aqueous solution of ammonium polycarboxylate (SN-DISPERSANT 5468 made by SAN NOPCO Limited) were uniformly dispersed in 100 parts by mass of water to prepare a coating solution. The coating solution was applied onto one surface of the polyolefin resin porous membrane obtained in Example 16 with a micro gravure coater. Water was removed by drying at 60° C. to form a porous layer having a thickness of 4 μm on the polyolefin resin porous membrane. Next, another porous layer having a thickness of 4 μm was formed on the other surface of the polyolefin resin porous membrane to obtain a 3-layered multilayer porous membrane. The physical properties of the polyolefin resin porous membrane and the multilayer porous layer obtained are shown in Table 4.

Comparative Example 24

A coating layer was formed with polyvinyl alcohol as a binder. 3.5 Parts by mass of polyvinyl alcohol (average degree of polymerization: 1700, degree of saponification: not less than 99%) was uniformly dissolved in 150 parts by mass of water; and 96.5 parts by mass of aluminum hydroxide oxide (average particle size: 1.8 μm) was then added thereto, and was uniformly dispersed to prepare a coating solution. The coating solution was applied onto the surface of the polyolefin resin porous membrane obtained in Example 18 with a micro gravure coater. Water was removed by drying at 60° C. to obtain a multilayer porous membrane including a polyolefin resin porous membrane and a porous layer formed on the polyolefin resin porous membrane and having a thickness of 7 μm. The physical properties of the polyolefin resin porous membrane and the multilayer porous layer obtained are shown in Table 5.

Comparative Example 25

A coating layer was formed with a polyvinylidene fluoride copolymer as a binder. 100 Parts by mass of aluminum hydroxide oxide (average particle size: 1.8 μm) was added to 150 parts by weight of a polyvinylidene fluoride (PVDF)-hexafluoropropylene (HFP) copolymer solution (HFP: 1 mol %, 5 wt % NMP solution), and was uniformly dispersed to prepare a coating solution. The coating solution was applied onto the surface of the polyolefin resin porous membrane obtained in Example 16 with a micro gravure coater. The membrane was immersed in a water bath, and NMP was then washed off with hot water at 60° C. The membrane was then dried to remove water to obtain a multilayer porous membrane including a polyolefin resin porous membrane and a porous layer formed on the polyolefin resin porous membrane and having a thickness of 7 μm. The physical properties of the polyolefin resin porous membrane and the multilayer porous layer obtained are shown in Table 5.

Comparative Example 26

A multilayer porous membrane was obtained in the same manner as that in Example 18 except that the binder was replaced with an acrylic latex suspension (solid content: 40%, average particle size: 600 nm) having an average particle size of 600 nm. The physical properties of the polyolefin resin porous membrane and the multilayer porous layer obtained are shown in Table 5.

Comparative Example 27

A multilayer porous membrane was obtained in the same manner as that in Example 18 except that the binder was replaced with an acrylic latex suspension (solid content: 40%, average particle size: 40 nm) having an average particle size of 40 nm. The physical properties of the polyolefin resin porous membrane and the multilayer porous layer obtained are shown in Table 5.

Comparative Example 28

A multilayer porous membrane was obtained in the same manner as that in Example 16 except that the heat setting temperature was 133° C., the largest TD magnification was 2.6 times, and the relaxation rate was 0.96. The physical properties of the polyolefin resin porous membrane and the multilayer porous layer obtained are shown in Table 5.

Comparative Example 29

47.5 Parts by mass of homopolymer polyethylene having an Mv of 700000, 47.5 parts by mass of homopolymer polyethylene having an Mv of 250000, and 5 parts by mass of homopolymer polypropylene having an My of 400000 were dry blended with a tumbler blender. As an antioxidant, 1% by mass of pentaerythrityl-tetrakis-[3-(3,5-di-t-butyl-4-hydroxyphenyl)propionate] was added to 99% by mass of the obtained pure polymer mixture, and was dry blended with the tumbler blender again to prepare a mixture of the polymers and the like. After replacement by nitrogen, the obtained mixture of the polymers and the like was fed to a twin screw extruder under a nitrogen atmosphere with a feeder. Liquid paraffin (kinematic viscosity at 37.78° C.: $7.59 \times 10^{-5}$ m$^2$/s) as a plasticizer was injected into an extruder cylinder with a plunger pump. The feeder and the pump were adjusted such that the ratio of the amount of liquid paraffin to the mixture of all the components melt kneaded and extruded was 68% by mass. For the melt kneading conditions, a preset temperature was 200° C., a screw rotation speed was 240 rpm, and an amount of discharge was 12 kg/h.

Then the melt kneaded product was extruded through a T die and cast onto a cooling roll, whose surface temperature was controlled to be 25° C., to obtain a sheet-like polyolefin composition having a thickness of 1300 μm.

Next, the sheet was guided to a simultaneous biaxial tenter stretching machine, and was subjected to simultaneous biaxial stretching of 7 times in MD and 6.1 times in TD. At this time, a preset temperature in the simultaneous biaxial tenter was 117° C. Next, the sheet was guided to a tank of methyl ethyl ketone, and liquid paraffin was removed by extraction. Thereafter, methyl ethyl ketone was removed by drying. Next, the sheet was guided to a TD tenter, and subjected to heat setting. The heat setting temperature was 122° C., the largest TD magnification was 1.4 times, and the relaxation rate was 0.85. The physical properties of the polyolefin resin porous membrane obtained are shown in Table 5.

Next, 92.0 parts by mass of aluminum hydroxide oxide (average particle size: 1.0 μm), 8.0 parts by mass of an acrylic latex suspension (solid content: 40%, average particle size 150 nm), and 1.0 part by mass of an aqueous solution of ammonium polycarboxylate (SN-DISPERSANT 5468 made by SAN NOPCO Limited) were uniformly dispersed in 100 parts by mass of water to prepare a coating solution. The coating solution was applied onto the surface of the polyolefin resin porous membrane with a micro gravure coater. Water was removed by drying at 60° C. to obtain a multilayer porous membrane including a polyolefin resin porous membrane and a porous layer having a thickness of 7 μm and formed on the polyolefin resin porous membrane. The physical properties of the multilayer porous layer obtained are shown in Table 5.

Comparative Example 30

47 Parts by mass of homopolymer polyethylene having an Mv of 700000, 46 parts by mass of homopolymer polyethylene having an Mv of 250000, and 7 parts by mass of homopolymer polypropylene having an Mv of 400000 were dry blended with a tumbler blender. As an antioxidant, 1% by mass of pentaerythrityl-tetrakis-[3-(3,5-di-t-butyl-4-hydroxyphenyl)propionate] was added to 99% by mass of the obtained pure polymer mixture, and was dry blended with the tumbler blender again to prepare a mixture of the polymers and the like. After replacement with nitrogen, the obtained mixture of the polymers and the like was fed to a twin screw extruder under a nitrogen atmosphere with a feeder. Liquid paraffin (kinematic viscosity at 37.78° C.: $7.59\times10^{-5}$ m$^2$/s) as a plasticizer was injected into an extruder cylinder with a plunger pump. The feeder and the pump were adjusted such that the ratio of the amount of liquid paraffin to the mixture of all the components melt kneaded and extruded was 65% by mass. For the melt kneading conditions, a preset temperature was 200° C., a screw rotation speed was 240 rpm, and an amount of discharge was 12 kg/h.

Then the melt kneaded product was extruded through a T die and cast onto a cooling roll, whose surface temperature was controlled to be 25° C., thereby to obtain a sheet-like polyolefin composition having a thickness of 1700 μm.

Next, the sheet was guided to a simultaneous biaxial tenter stretching machine, and was subjected to simultaneous biaxial stretching of 7 times in MD and 6.1 times in TD. At this time, a preset temperature in the simultaneous biaxial tenter was 125° C. Next, the sheet was guided to a tank of methyl ethyl ketone, and liquid paraffin was removed by extraction. Thereafter, methyl ethyl ketone was removed by drying. Next, the sheet was guided to a TD tenter, and subjected to heat setting. The heat setting temperature was 125° C., the largest TD magnification was 1.7 times, and the relaxation rate was 0.82. The physical properties of the polyolefin resin porous membrane obtained are shown in Table 5.

Next, 92.0 parts by mass of aluminum hydroxide oxide (average particle size: 1.0 μm), 8.0 parts by mass of an acrylic latex suspension (solid content: 40%, average particle size: 150 nm), and 1.0 part by mass of an aqueous solution of ammonium polycarboxylate (SN-DISPERSANT 5468 made by SAN NOPCO Limited) were uniformly dispersed in 100 parts by mass of water to prepare a coating solution. The coating solution was applied onto the surface of the polyolefin resin porous membrane with a micro gravure coater. Water was removed by drying at 60° C. to obtain a multilayer porous membrane including a polyolefin resin porous membrane and a porous layer having a thickness of 7 μm and formed on the polyolefin resin porous membrane. The physical properties of the multilayer porous layer obtained are shown in Table 5.

Figure 2:
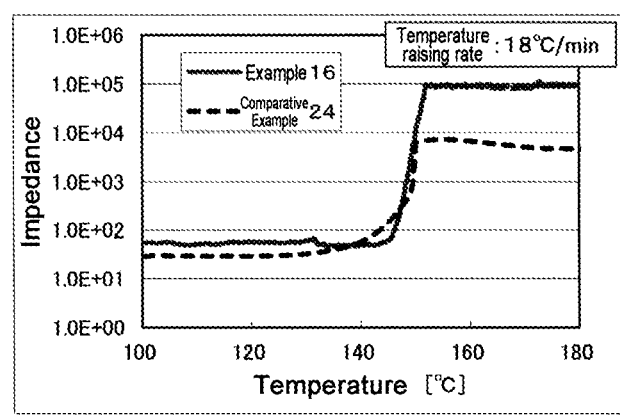
FIG. 2 shows the results of evaluation on shutdown at a temperature raising rate of 18° C./min in Example 16 and Comparative Example 24.

FIG. 1 shows a graph on shutdown measurement at a temperature raising rate of 2° C./min in Example 16 and Comparative Example 24 while FIG. 2 shows a graph on shutdown measurement at a temperature raising rate of 18° C./min in Example 16 and Comparative Example 24. When the temperature raising rate is 2° C./min, the shutdown rate in Example 16 is similar to that in Comparative Example 24 (Example 14: 24 seconds, Comparative Example 22: 24 seconds). When the temperature raising rate is 18° C./min, the shutdown rates are different (Example 14: 8.7 seconds, Comparative Example 22: 21 seconds). The graphs indicate that the polyolefin resin porous membrane in Example 16 exhibits a shutdown behavior in a short time at a high temperature raising rate.

Figure 3:
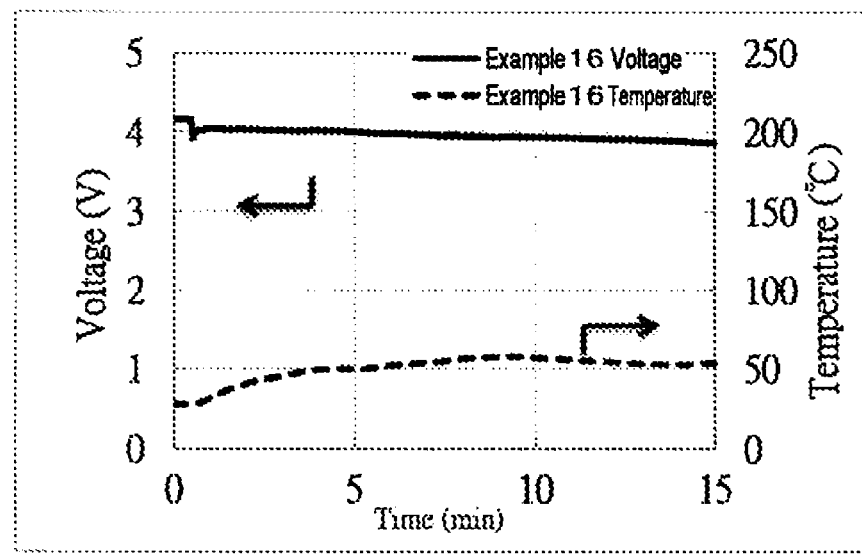
FIG. 3 shows the results of nail penetration evaluation in Example 16.
Figure 4:
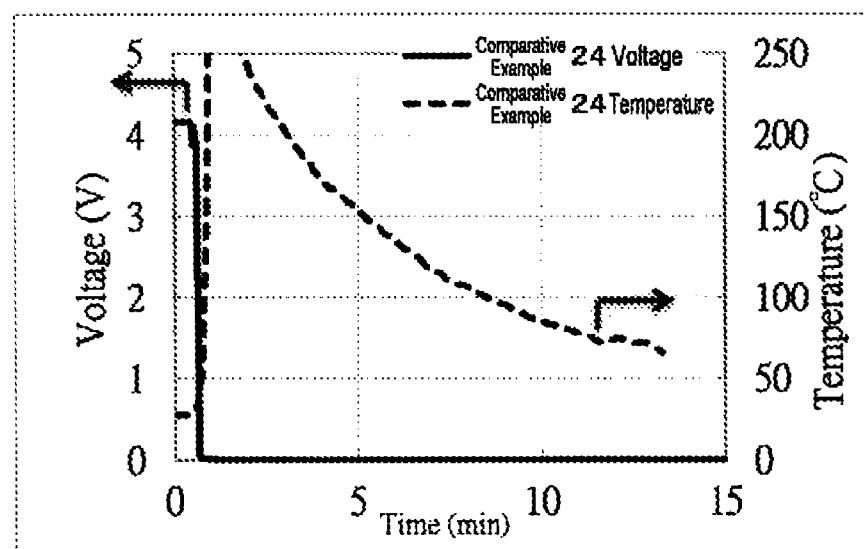
FIG. 4 shows the results of nail penetration evaluation in Comparative Example 24.

FIG. 3 shows a graph on the results of nail penetration evaluation in Example 16 while FIG. 4 shows a graph on the results of nail penetration evaluation in Comparative Example 24. The polyolefin resin porous membrane in Example 16 did not ignite while the polyolefin resin porous membrane in Comparative Example 24 ignited and exploded. The outer surface temperature of the cell including the polyolefin resin porous membrane in Example 16 was around 60° C. After the nail penetration evaluation was completed, the cell was dissembled and examined. A shutdown behavior was found in the vicinity of the portion through which the nail penetrated. From this, it is presumed that the temperature rose rapidly to reach beyond the melting point of polyolefin in the vicinity of the nail penetrating portion.

TABLE 4

| | Porous membrane (A) | | | | | | Porous layer (B) | | |
|---|---|---|---|---|---|---|---|---|---|
| | | | | | | | | Binder | |
| Examples | Membrane thickness um | Porosity % | Air permeability Sec | Number of pores pores/μm$^2$ | Pore size um | Puncture strength gf | Inorganic particle Type | Type | Average particle size nm |
| Example 16 | 16 | 55 | 90 | 130 | 0.059 | 470 | Aluminum hydroxide oxide | LTX | 150 |
| Example 17 | 16 | 55 | 90 | 130 | 0.059 | 470 | Calcined kaolin | LTX | 150 |

TABLE 4-continued

| Examples | | | | | | | | | |
|---|---|---|---|---|---|---|---|---|---|
| Example 18 | 18 | 61 | 84 | 190 | 0.054 | 390 | Aluminum hydroxide oxide | LTX | 150 |
| Example 19 | 18 | 61 | 84 | 190 | 0.054 | 390 | Aluminum hydroxide oxide | LTX | 60 |
| Example 20 | 18 | 61 | 84 | 190 | 0.054 | 390 | Aluminum hydroxide oxide | LTX | 460 |
| Example 21 | 23 | 55 | 226 | 382 | 0.038 | 460 | Aluminum hydroxide oxide | LTX | 150 |
| Example 22 | 11 | 66 | 40 | 226 | 0.055 | 300 | Aluminum hydroxide oxide | LTX | 150 |
| Example 23 | 16 | 80 | 32 | 458 | 0.045 | 360 | Aluminum hydroxide oxide | LTX | 150 |
| Example 24 | 18 | 61 | 84 | 190 | 0.054 | 390 | Aluminum hydroxide oxide | LTX | 150 |

| Examples | Porous layer (B) Layer thickness um | Multilayer porous membrane | | | | | |
|---|---|---|---|---|---|---|---|
| | | Structure — | Membrane thickness um | Air permeability sec | Increase in air permeability sec | Rate capability % | Nail penetration Evaluation ○/x |
| Example 16 | 7 | A/B | 23 | 93 | 3 | 68 | ○ |
| Example 17 | 7 | A/B | 23 | 92 | 2 | 70 | ○ |
| Example 18 | 7 | A/B | 25 | 87 | 3 | 68 | ○ |
| Example 19 | 7 | A/B | 25 | 90 | 7 | 64 | ○ |
| Example 20 | 7 | A/B | 25 | 87 | 3 | 71 | ○ |
| Example 21 | 7 | A/B | 30 | 229 | 4 | 66 | ○ |
| Example 22 | 6 | A/B | 17 | 43 | 3 | 73 | ○ |
| Example 23 | 7 | A/B | 23 | 35 | 2 | 75 | ○ |
| Example 24 | 4.4 | B/A/B | 26 | 92 | 8 | 66 | ○ |

TABLE 5

| Comparative Examples | Porous membrane (A) | | | | | | Porous layer (B) | | |
|---|---|---|---|---|---|---|---|---|---|
| | Membrane thickness um | Porosity % | Air permeability Sec | Number of pores pores/μm² | Pore size um | Puncture strength gf | Inorganic particle Type — | Binder Type — | Average particle size nm |
| Comparative Example 24 | 18 | 61 | 84 | 190 | 0.054 | 390 | Aluminum hydroxide oxide | PVA | (Soluble) |
| Comparative Example 25 | 18 | 61 | 84 | 190 | 0.054 | 390 | Aluminum hydroxide oxide | PVDF-HFP | (Soluble) |

TABLE 5-continued

| Comparative Example | | | | | | | | | |
|---|---|---|---|---|---|---|---|---|---|
| Comparative Example 26 | 18 | 61 | 84 | 190 | 0.054 | 390 | Aluminum hydroxide oxide | LTX | 600 |
| Comparative Example 27 | 18 | 61 | 84 | 190 | 0.054 | 390 | Aluminum hydroxide oxide | LTX | 40 |
| Comparative Example 28 | 11 | 55 | 33 | 26 | 0.09 | 380 | Aluminum hydroxide oxide | LTX | 150 |
| Comparative Example 29 | 16 | 48 | 180 | 109 | 0.055 | 340 | hydroxide Aluminum hydroxide | LTX | 150 |
| Comparative Example 30 | 16 | 43 | 230 | 69 | 0.06 | 500 | Aluminum hydroxide oxide | LTX | 150 |

| Comparative Examples | Porous Layer (B) Layer thickness um | Multilayer porous membrane | | | | |
|---|---|---|---|---|---|---|
| | | Structure — | Membrane thickness um | Air permeability sec | Increase in air permeability sec | Rate capability % | Nail penetration Evaluation o/x |
| Comparative Example 24 | 7 | A/B | 25 | 109 | 25 | 52 | x |
| Comparative Example 25 | 7 | A/B | 25 | 130 | 46 | 52 | x |
| Comparative Example 26 | 7 | A/B | 25 | 88 | 4 | 67 | x |
| Comparative Example 27 | 7 | A/B | 25 | 94 | 10 | 58 | x |
| Comparative Example 28 | 7 | A/B | 18 | 54 | 21 | 59 | x |
| Comparative Example 29 | 7 | A/B | 23 | 190 | 10 | 54 | o |
| Comparative Example 30 | 7 | A/B | 23 | 249 | 19 | 46 | o |

The properties in Examples 16 to 24 are shown in Table 4 and the properties in Comparative Examples 24 to 30 are shown in Table 5.

It is clear that the multilayer porous membranes in Examples 18 to 20 exhibit superior rate capability and safety against nail penetration compared to those in Comparative Examples 24 and 25 in which the binder is not a latex. When a latex binder is used, the multilayer porous membranes in Comparative Example 26 (average particle size: 600 nm) and Comparative Example 27 (average particle size: 40 nm) exhibit inferior safety against nail penetration. Apparently, the difference in safety is derived from the difference in average particle size.

The multilayer porous membranes in Comparative Example 29 and 30 are superior in the nail penetration evaluation while the rate capability is significantly inferior. Apparently, the porosity contributes to the difference in the rate capability. In Comparative Example 28, the number of pores in the porous membrane is small, resulting in inferior rate capability and safety.

In Examples 16 to 24, rate capability and safety against nail penetration are satisfied at the same time. The results indicate that the multilayer porous membranes in Examples 16 to 24 can be used as a separator for nonaqueous electrolyte batteries.

EXPLANATIONS OF REFERENCE SIGNS

3 separator
11 positive electrode sheet
12 aluminum foil
21 negative electrode sheet
22 copper foil This application is based on Japanese Patent Application Nos. 2012-074669 and 2012-074689, filed with the Japanese Patent Office on Mar. 28, 2012 and Japanese Patent Application Nos. 2012-090420 and 2012-090470 filed with the Japanese Patent Office on Apr. 11, 2012, the contents of which are incorporated herein by reference.

INDUSTRIAL APPLICABILITY

The porous membranes and multilayer porous membranes in Embodiments have superior output properties, and have industrial applicability particularly as a separator for lithium ion secondary batteries and lithium ion capacitors in high output applications.

The invention claimed is:

1. A separator for nonaqueous electrolyte batteries comprising a porous membrane comprising a polyolefin resin composition as a main component,
    wherein the porous membrane has a porosity ($\epsilon$) of 50 to 90%, and a shrinkage stress at 85° C. of not more than 2.2 grams-force, wherein the porosity and the shrinkage stress are measured under conditions without a porous layer laminated on at least one surface of the porous membrane and comprising an inorganic filler and a resin binder.

2. The separator according to claim 1, further comprising a porous layer laminated on at least one surface of the porous membrane and comprising an inorganic filler and a resin binder.

3. The separator according to claim 2, wherein the porous layer has a thickness of not less than 3 μm and not more than 50 μm.

4. The separator according to claim 1, wherein the polyolefin composition comprises polypropylene and a polyolefin other than the polypropylene.

5. A nonaqueous electrolyte battery, comprising the separator according to claim 1, a positive electrode, a negative electrode, and an electrolytic solution.

\* \* \* \* \*